United States Patent
Hayashi et al.

[11] Patent Number: 6,064,403
[45] Date of Patent: May 16, 2000

[54] APPARATUS FOR AND METHOD OF PERFORMING IMAGE-DRAWING PROCESSING

[75] Inventors: Kazuto Hayashi; Masao Morita, both of Nakai-machi, Japan

[73] Assignee: Fuji Photo Co., Ltd., Tokyo, Japan

[21] Appl. No.: 09/065,617

[22] Filed: Apr. 24, 1998

[30] Foreign Application Priority Data

Apr. 25, 1997 [JP] Japan ................................. 9-108506

[51] Int. Cl.[7] ............................................. G06F 15/80
[52] U.S. Cl. ......................... 345/505; 709/104; 358/1.1
[58] Field of Search ............................. 345/505, 501, 345/507; 358/1.1; 709/104, 105

[56] References Cited

U.S. PATENT DOCUMENTS

| 5,426,727 | 6/1995 | Sigiura et al. | 345/467 |
| 5,859,956 | 1/1999 | Sugiyama et al. | 358/1.1 |

FOREIGN PATENT DOCUMENTS

| 4-170686 | 6/1992 | Japan | G06F 15/72 |
| 6-28126 | 2/1994 | Japan | G06F 3/12 |

*Primary Examiner*—Kee M. Tung
*Attorney, Agent, or Firm*—Oliff & Berridge

[57] ABSTRACT

Described herein is an apparatus for and a method of performing image-drawing processing on image-drawn objects such as at least characters or graphics with the image-drawn objects as an input. The apparatus comprises a list generating device that generates a list of image-drawn factor elements constituting the image-drawn objects, an image-drawn factor elements sorting device that classifies the image-drawn factor elements by use of reference values constant to information about the lengths of the image-drawn factor elements constituting the list, an image-drawn factor elements storing device that stores the classified image-drawn factor elements therein so as to correspond to the reference values, a plurality of image-drawing processing devices that perform parallel image-drawing processing on the image-drawn factor elements, an image-drawing area allocating device that divides an image drawing area into pieces and assigning the divided image-drawing areas to the image-drawing processing devices, an image-drawn factor elements transfer controlling device that transfers the image-drawn factor elements from the image-drawn factor elements storing device to said image-drawing processing device in association with the reference values, and a synthesizing and outputting device that synthesizes results of the image-drawing processing on the image-drawn factor elements by the image-drawing processing device and outputting the result of synthesis therefrom.

16 Claims, 29 Drawing Sheets

Fig. 16

11b Data structure

| YMIN | Minimum value of Y coordinate |
|---|---|
| YMAX | Maximum value of Y coordinate |
| X1 | X coordinate value of left oblique side at minimum value of Y coordinate |
| X2 | X coordinate value of right oblique side at minimum value of Y coordinate |
| DX1 | Incremented value of X coordinate value at the time that Y coordinate of left oblique side is increased by unit amount |
| DX2 | Incremented value of X coordinate value at the time that Y coordinate of right oblique side is increased by unit amount |
| ATTR | Filling attribute of colors or the like |
| PRIO | Filling priority |

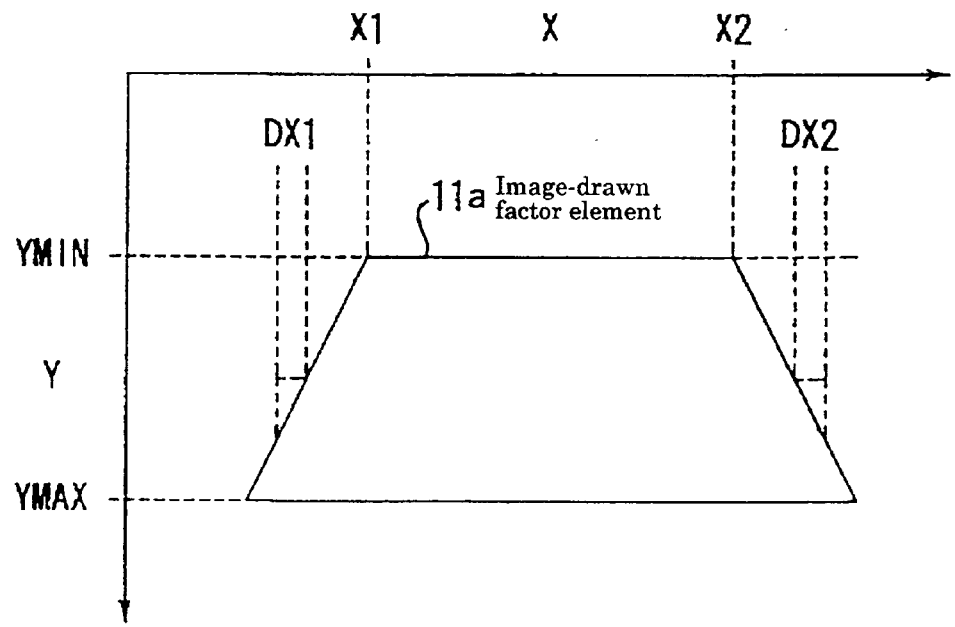

APPARATUS FOR AND METHOD OF PERFORMING IMAGE-DRAWING PROCESSING

BACKGROUND OF THE INVENTION

1. Field of the Invention

This invention relates to an image-drawing processing apparatus and an image-drawing processing method, and particularly to an apparatus for and a method of performing image-drawing processing on image-drawn objects or image-drawn objects such as characters or graphics with the image-drawn objects as an input.

2. Description of the Related Art

Upon printing a paper document by a page printer, PDL (Page Description Language) such as Inter press (Registered trademark of U.S. Xerox Inc.) or PostScript (Trademark of US Adobe Systems Inc.)are commonly used as an input printing image.

When such a PDL is printed as the input, an imaging process for converting data represented in a PDL format to data of a format fit to a raster output device must be performed. However, the time required to execute the imaging processing is commonly very long and hence this turns into a problem for a system or the like for outputting data to a high-speed page printer in particular.

Even though, for example, a color high-speed page printer has an output capacity of above 40 sheets per minute, the time required to perform imaging processing needs several tens of seconds to a few minutes and hence the capability of the expensive high-speed page printer could not be utilized sufficiently. Thus, the speeding up of the imaging processing needs to perform parallel image-dawning processing.

Japanese Published Unexamined Patent Application No. Heisei 4-170686 discloses, as a technique for executing the parallel image-drawing processing, one for dividing an image-drawing area into rectangular form and performing parallel processing on filling areas or regions lying within the divided respective areas.

According to Japanese Published Unexamined Patent Application No. Heisei 6-28126, an image-drawing area is divided into band form and the divided areas are subjected to parallel image-drawing processing by a plurality of computers or a plurality of printer devices.

However, the prior arts described above needed to re-arrange data on image-drawn objects every areas in advance before the image-drawing of the divided respective areas in parallel. Namely, these arts needed to carry out, prior to image-drawing processing, a process for making a preparation so as to check to which divided areas the respective image-drawn objects belong, e.g., copy and divide data when they belong to the plurality of areas, and perform the image-drawing processing on the objects independently every divided areas.

Particularly when the area is divided into pieces and loads every areas are predicted to thereby keep in balance loads applied to a device for performing parallel processing, the time necessary for the pre-treatment increases.

Namely, when the area is divided into pieces, the probability that division processing will be effected on each image-drawn objects, is increased, so that its processing time takes long.

On the other hand, when each area is not uniform in size or form, a process for checking to which divided areas the individual image-drawn objects belong, will turn into a search problem heavier in processing load, which is other than a simple arithmetic operation.

Therefore, the prior arts could not obtain a sufficient paralleled effect due to both overhead of the pre-treatment itself and a loss produced due to inability to keep the processing loads in balance in order to prevent the pre-treatment load from being excessively increased.

In contrast to this, a method is also considered wherein image-drawing processors to which areas are assigned, respectively read all of image-drawn objects data without preparing image-drawn objects data every divided areas in advance and respectively adopt or reject them.

This method brings about an increase in the amount of transfer of data and needs to make a check as to whether the respective image-drawing processors require the data about all data. Therefore, the overhead increases and eventually the parallel processing effect could not be obtained well.

SUMMARY OF THE INVENTION

With the foregoing points in view, it is therefore an object of the present invention to provide an image-drawing processing apparatus capable of eliminating the need for a process for preparing data every areas in advance, reducing overheads for a process related to the transfer data to a plurality of image-drawing processors and unnecessary data, and performing high-speed parallel image-drawing processing.

It is another object of the present invention to provide an image-drawing processing method for eliminating the need for a process for preparing data every areas in advance, reducing overheads for a process related to the transfer data to a plurality of image-drawing processors and unnecessary data, and performing high-speed parallel image-drawing processing.

According to one aspect of the present invention, for achieving the above objects, there is provided an image-drawing processing apparatus for performing image-drawing processing on image-drawn objects such as at least characters or graphics with the image-drawn objects as an input, comprising:

list generating means for generating a list of image-drawn factor elements constituting the image-drawn objects;

image-drawn factor element sorting means for classifying the image-drawn factor elements by use of reference values constant to information about the lengths of the image-drawn factor elements constituting the list;

image-drawn factor elements storing means for storing the classified image-drawn factor elements therein so as to correspond to the reference values;

a plurality of image-drawing processing means for performing parallel image-drawing processing on the image-drawn factor elements;

image-drawing area allocating means for dividing an image-drawing area and assigning the divided image-drawing areas to the image-drawing processing means;

image-drawn factor element transfer controlling means for transferring the image-drawn factor elements necessary for image-drawing processing of the image-drawing area from the image-drawn factor elements storing means to the image-drawing processing means in association with the reference values; and synthesizing and outputting means for synthesizing results of the image-drawing processing on the image-drawn factor elements by the image-drawing processing means and outputting the result of synthesis therefrom.

In the image-drawing processing apparatus, the list generating means generates a list of image-drawn factor elements that constitute image-drawn objects. The image-drawn factor element sorting means classifies the image-drawn factor elements by use of reference values constant to information about the lengths of the image-drawn factor elements constituting the list. The image-drawn factor elements storing means stores the classified image-drawn factor elements therein so as to correspond to the reference values. The image-drawing processing means respectively perform parallel image-drawing processing on the image-drawn factor elements. The image-drawing area allocating means divides an image-drawing area and assigns the divided image-drawing areas to their corresponding image-drawing processing means. The image-drawn factor element transfer controlling means transfers the image-drawn factor elements necessary for image-drawing processing of the image-drawing area from the image-drawn factor elements storing means to the image-drawing processing means in association with the reference values. The synthesizing and outputting means synthesizes results of the image-drawing processing on the image-drawn factor elements by the image-drawing processing means and outputs the result of synthesis therefrom.

According to another aspect of the present invention, for achieving the above objects, there is provided a method of performing image-drawing processing on image-drawn objects such as at least characters or graphics with the image-drawn objects as an input, comprising the following steps of:

generating a list of image-drawn factor elements constituting the image-drawn objects;

classifying the image-drawn factor elements by use of reference values constant to information about the lengths of the image-drawn factor elements constituting the list;

storing the classified image-drawn factor elements in association with the reference values;

dividing an image-drawing area;

transferring the image-drawn factor elements necessary for image-drawing processing of the image-drawing area in association with the reference values;

performing image-drawing processing on the transferred image-drawn factor elements; and synthesizing results of the image-drawing processing on the image-drawn factor elements and outputting the result of synthesis.

In the image-drawing processing method, image-drawn factor elements classified and stored based on constant reference values to length information are subjected to image-drawing processing in image-drawing area units. In this case, image-drawn factor elements completely included within an image-drawing area as well as image-drawn factor elements which are partly included within the image-drawing area and have the length information less than or equal to the reference values, are subjected to image-drawing processing.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 16 is a diagram illustrating a data structure of an image-drawn factor element;

DETAILED DESCRIPTION OF THE PREFERRED EMBODIMENTS

Figure 1:
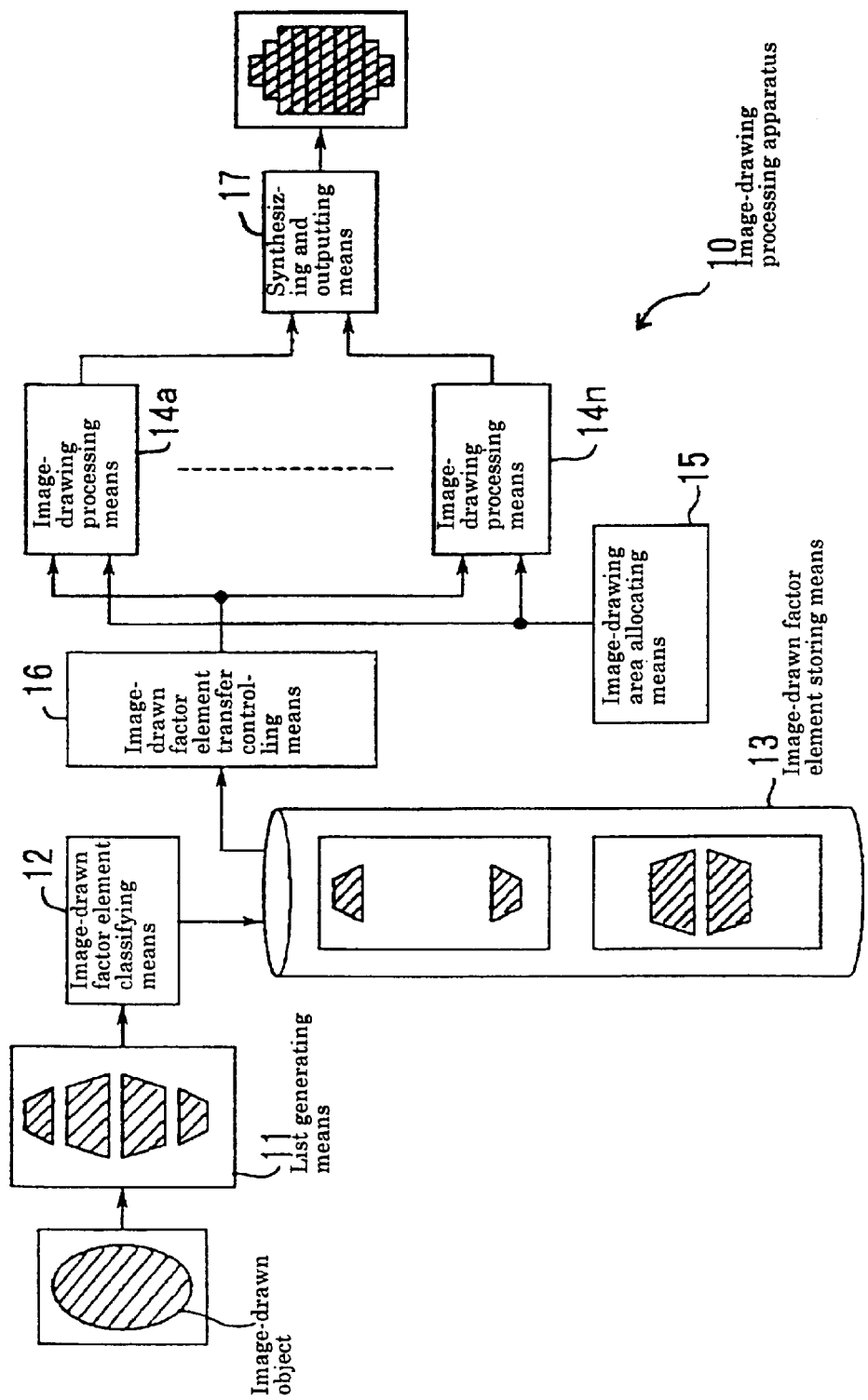
FIG. 1 is a diagram showing the principle of an image-drawing processing apparatus according to the present invention.

Preferred embodiments of the present invention will hereinafter be described with reference to the accompanying drawings. FIG. 1 is a diagram showing the principle of an image-drawing processing apparatus of the present invention. A list generating means 11 generates a list of image-drawn factor elements constituting image-drawn objects therefrom.

The term image-drawn objects indicates intermediate image data produced by interpreting and developing image-drawn data such as a PDL or the like. Further, the image-drawn factor elements are equivalent to image-drawn factors such as edge data, vector data and areas for filling characters, graphics and the like.

An image-drawn factor element sorting means 12 classifies image-drawn factor elements by use of reference values constant to information about the lengths of the image-drawn factor elements constituting the list. The length information will be described later. An image-drawn factor elements storing means 13 stores therein the classified image-drawn factor elements in association with the reference values.

Image-drawing processing means 14a through 14n perform parallel image-drawing processing on the image-drawn factor elements. An image-drawing area allocating means 15 divides an image-drawing area into partial areas or pieces and assigns the areas to their corresponding image-drawing processing means 14a through 14n. An image-drawn factor element transfer controlling means 16 transfers image-drawn factor elements necessary for image-drawing processing of the image-drawing area from the image-drawn factor elements storing means 13 to the image-drawing processing means 14a through 14n in association with the reference values.

A synthesizing and outputting means 17 synthesizes the results of image-drawing processes by the image-drawing processing means 14a through 14n and outputs the result of synthesis therefrom.

Figure 2:
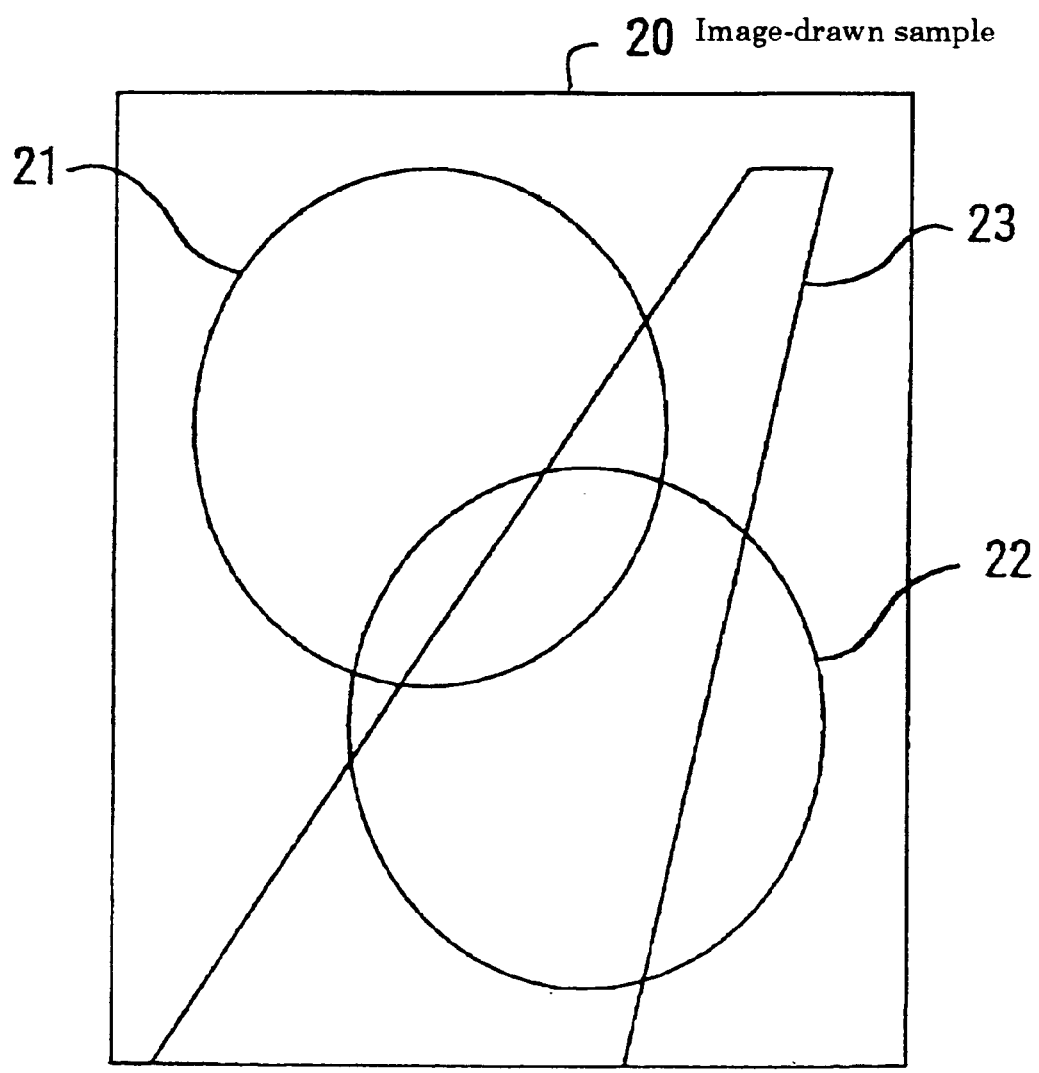
FIG. 2 is a diagram illustrating an image-drawn sample.

The operation of the present invention will next be explained in detail by use of a specific image-drawn sample. FIG. 2 is a diagram showing an image-drawn sample 20. The image-drawn sample 20 comprises two ellipses 21 and 22 and a trapezoidal pattern or graphics 23 used as image-drawn objects. In the subsequent description, the image-drawn sample 20 shown in the drawing is inputted to the image-drawing processing apparatus 10 according to the present invention.

Incidentally, the respective ellipses 21 and 22 and trapezoidal graphics 23 will be filled with different colors and hatch patterns and the sequence of overwriting will be also specified. However, the description of these processes will be omitted because they have little relationship to the present invention.

Figure 3:
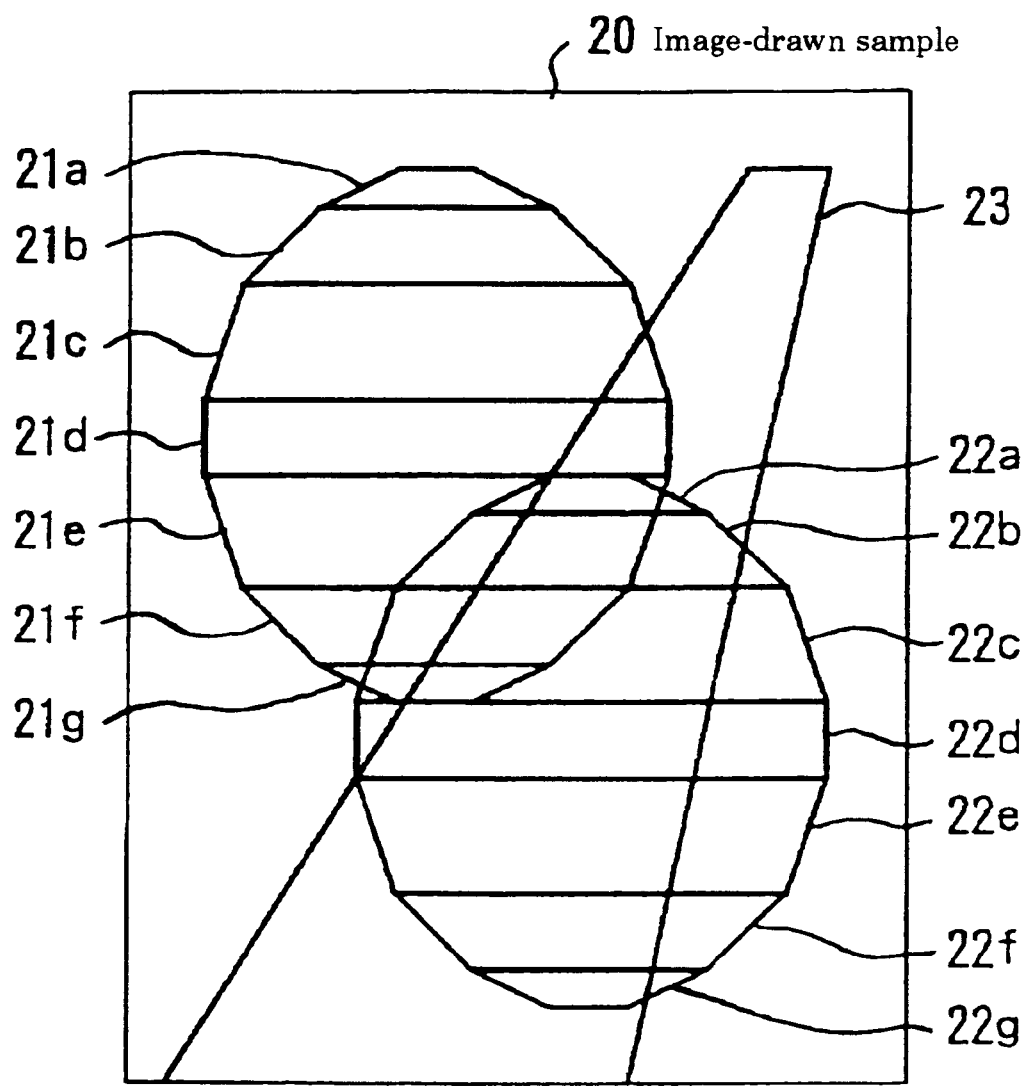
FIG. 3 is a conceptional diagram showing image-drawn factor elements.

The image-drawn factor elements will next be explained. FIG. 3 is a conceptional diagram of image-drawn factor elements. A list generating means 11 produces a list with an ellipse 21 as image-drawn factor elements 21a through 21g, an ellipse 22 as image-drawn factor elements 22a through 22g and a trapezoidal graphics 23 as an image-drawn factor element 23.

Figure 4:
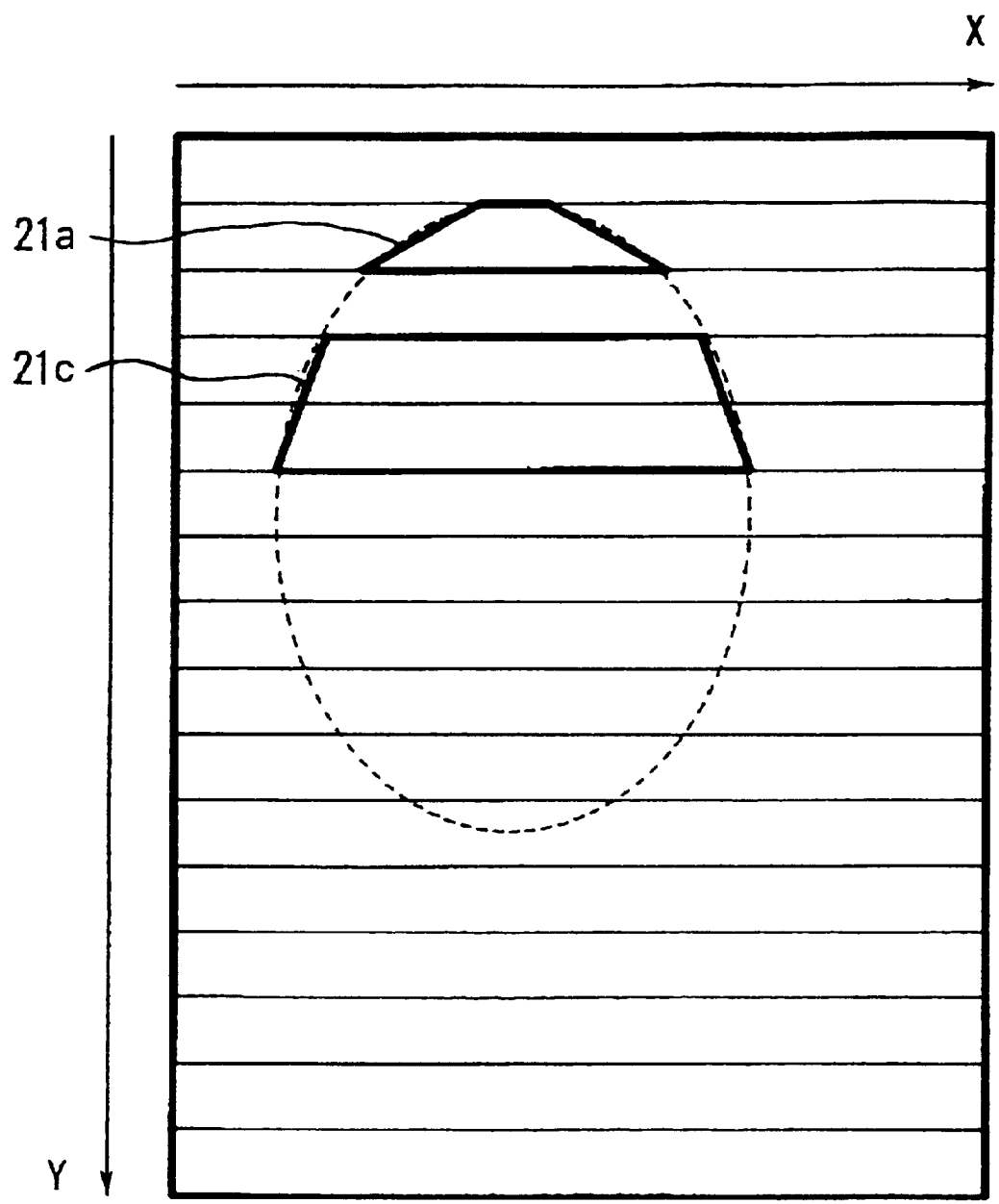
FIG. 4 is a conceptional diagram illustrating length information.

The length information will next be described. FIG. 4 is a conceptional diagram showing length information. X and Y coordinate axes are taken as shown in the drawing. A main-scanning direction will be defined as an X-axis direction and a sub-scanning direction will be defined as a Y-axis direction.

When an image-drawing area is divided into several areas or pieces in the horizontal direction, for example, the height of each vertical line orthogonal to the boundary between the divided adjacent image-drawing areas is defined as the length information.

For example, information about the length of image-drawn factor elements 21a with respect to such a coordinate system is set so that the image-drawing area starts from the second scanning line and the height in the sub-scanning line direction is equal to one scanning line (the position given as 2 and the height given as 1). Further, image-drawn factor data 21c is set so that the image-drawing area starts from the fourth scanning line and the height in the sub-scanning line direction results in 2 (the position given as 4 and the height given as 2). Thus, the positions and heights of the respective image-drawn factor elements will be defined as the length information.

If the image-drawing areas are assigned in the vertical direction, then the width of each vertical line orthogonal to the boundary between the assigned adjacent image-drawn areas is defined as length information. However, the length information will be described subsequently as the position and height of each image-drawn factor element.

Figure 5:
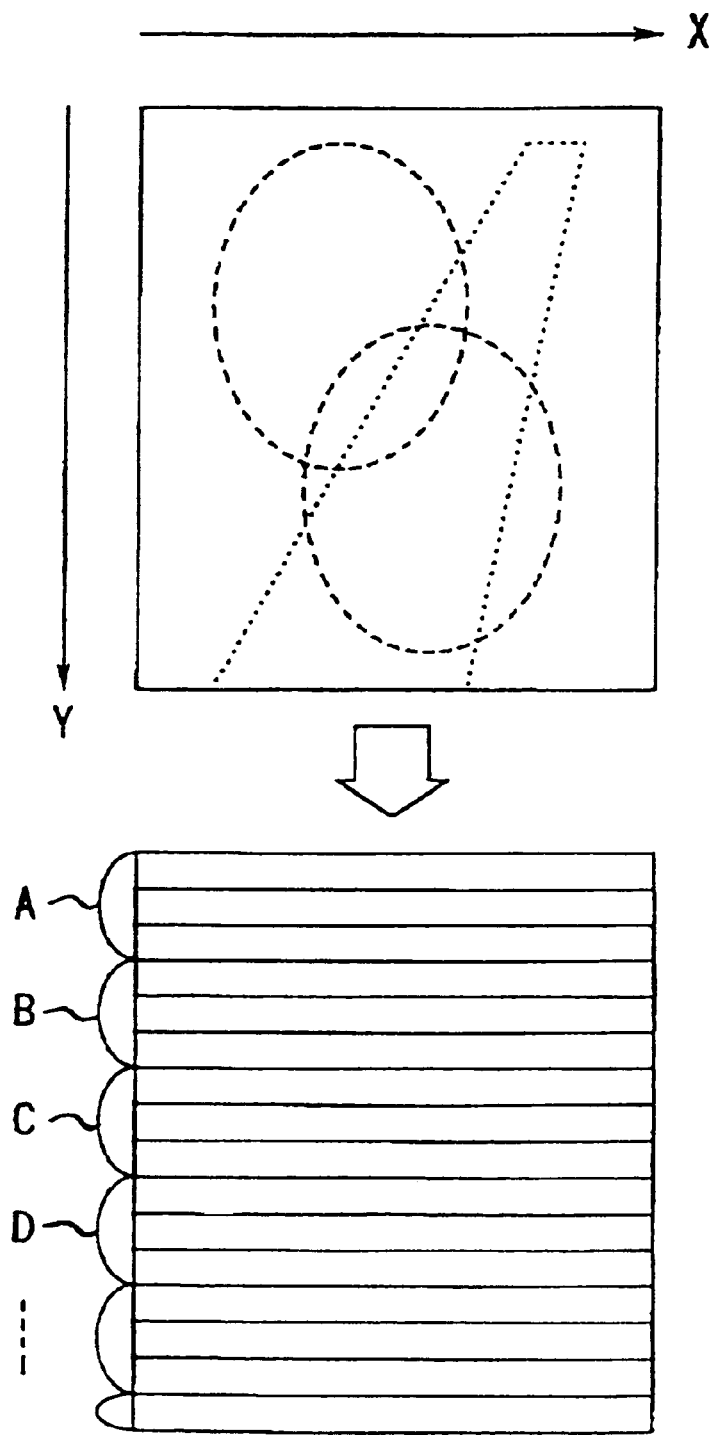
FIG. 5 is a diagram showing image-drawing areas.

The image-drawing area allocating means 15 will next be explained. FIG. 5 is a diagram showing an image-drawing area. The image-drawing area allocating means 15 divides an image-drawing area into a plurality of pieces in parallel to an X axis. Further, divided image-drawing areas having scanning lines provided three by three are assigned to the image-drawing processing means 14a through 14n respectively. For example, a divided image-drawing area A is assigned to the image-drawing processing means 14a, a divided image-drawing area B is assigned to the image-drawing processing means 14b, a divided image-drawing area C is assigned to the image-drawing processing means 14c, . . . .

Figure 6:
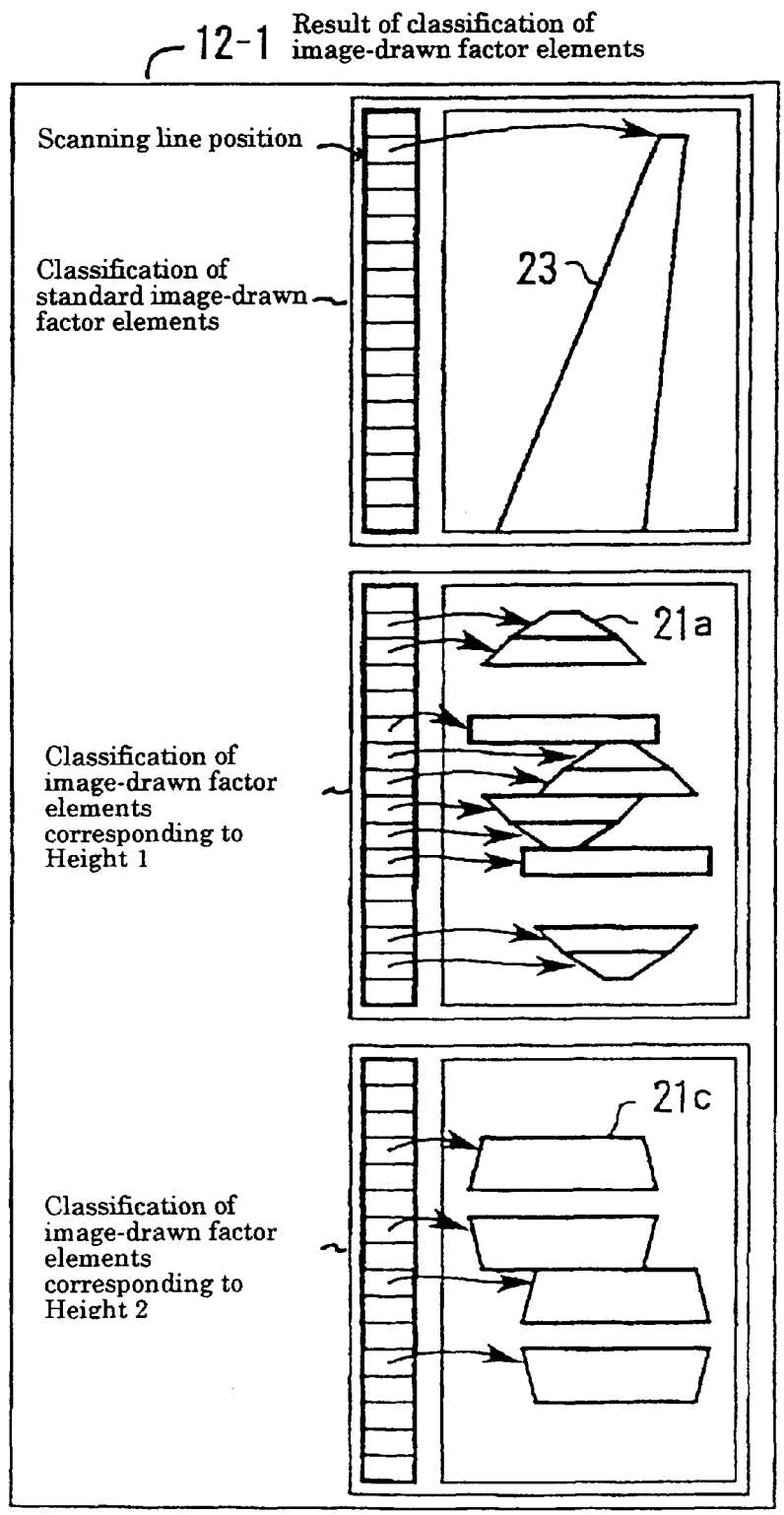
FIG. 6 is a diagram illustrating the result of classification of image-drawn factor elements.

The image-drawn factor elements sorting means 12 will next be described. FIG. 6 is a diagram showing a result of classification of image-drawn factor elements 12-1. The image-drawn factor elements sorting means 12 classifies image-drawn factor elements by use of reference values constant to information about the lengths of image-drawn factor elements constituting a list.

For example, image-drawn factor elements 21a is classified with the position thereof in the sub-scanning line direction as 2 and the height thereof in the sub-scanning line direction as 1. Further, image-drawn factor elements 21c is classified with the position thereof in the sub-scanning line direction as 4 and the height thereof in the sub-scanning line direction as 2. Thus, the image-drawn factor elements are classified according to the reference values such as the height 1, height 2, image-drawn factor elements other than these.

Figure 7:
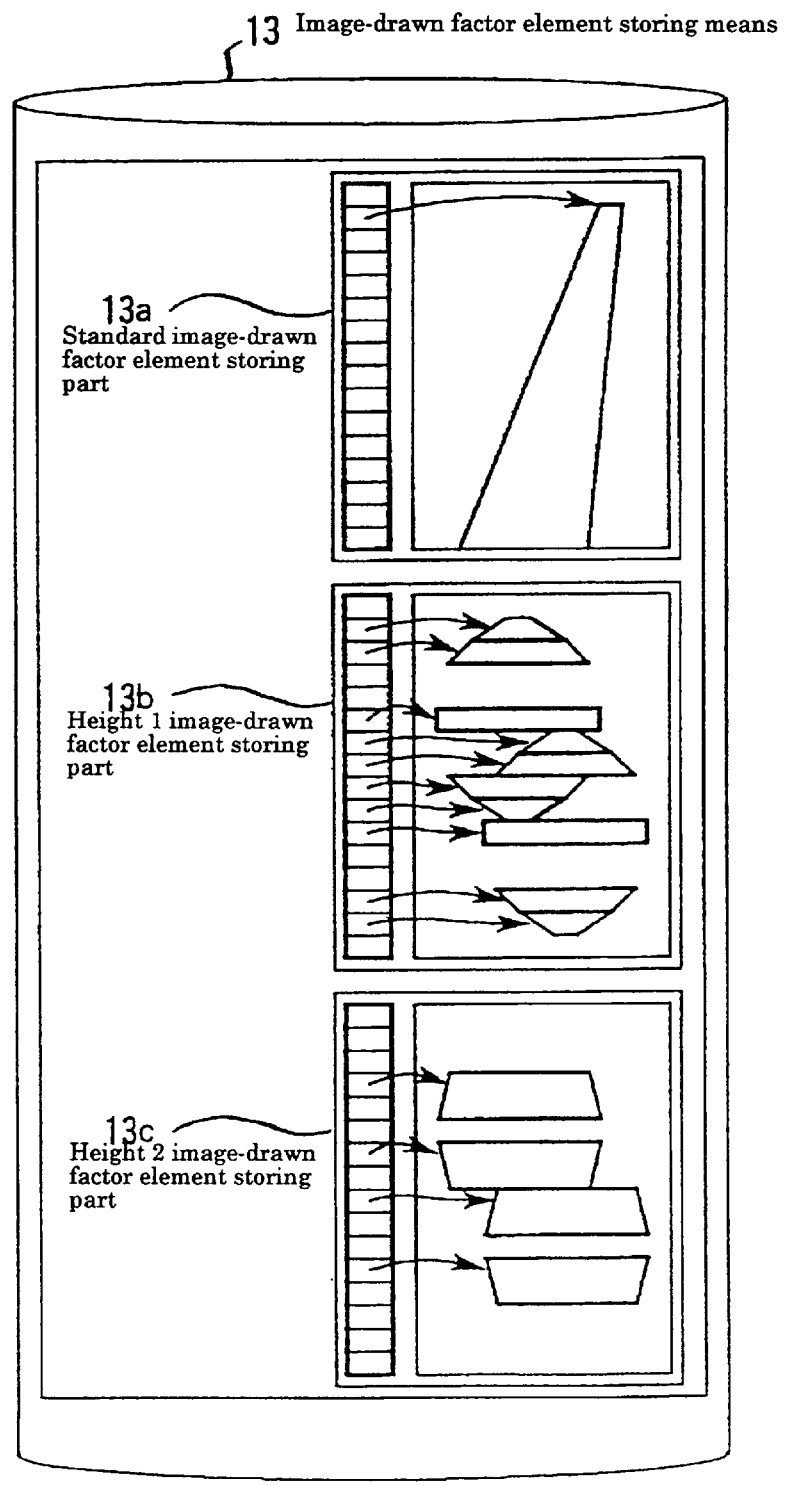
FIG. 7 is a conceptional diagram showing the state of storage of classified image-drawn factor elements.

The image-drawn factor elements storing means 13 will next be described. FIG. 7 is a conceptional diagram showing the state in which classified image-drawn factor elements are being stored. Image-drawn factor elements (hereinafter called "standard image-drawn factor elements"), which do not fall under the classification of a height 1 or 2, are stored in standard image-drawn factor elements storing part 13 image-drawn factor elements, which fall under the classification of the height 1, are stored in a height-1 image-drawn factor elements storing part 13b, and image-drawn factor elements, which fall under the classification of the height 2, are stored in a height-2 image-drawn factor elements storing part 13c, respectively.

A description will next be made of the assignment of image-drawing areas by each image-drawing processing means. However, a system comprised of three image-drawing processing means 14a through 14c will be explained in the interests of simplicity. When an image-drawing processing start is notified, the image-drawing processing means 14a through 14c inquire of the image-drawing area allocating means 15 portions to take charge of the first processing simultaneously or in due order.

The image-drawing area allocating means 15 exclusively performs the operations for assigning processing units to the image-drawing processing means and assigns the processing units thereto in request order.

Since the assignment of the initial processing at the start of the image-drawing processing is made here, the respective image-drawing processing means 14a through 14c request processes in their charge substantially simultaneously. Thus, the divided image-drawing areas A, B, C, . . . are respectively assigned to the image-drawing processing means 14a through 14c as described in FIG. 5.

Figure 8:
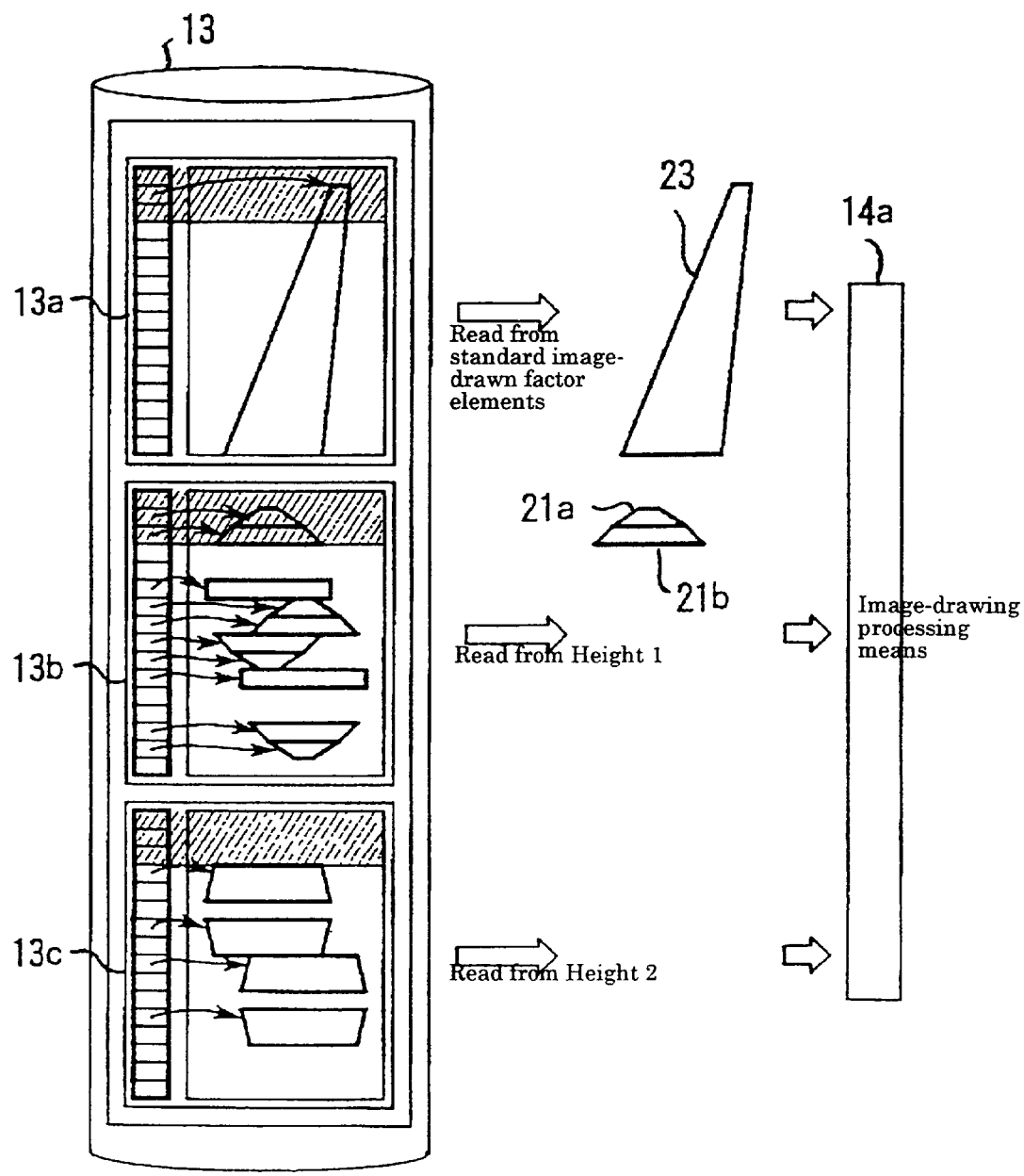
FIG. 8 is a conceptional diagram illustrating the reading of image-drawn factor elements at the time that a divided image-drawing area A is processed by an image-drawing processing means.

The image-drawing processing means 14a will next be explained. FIG. 8 is a conceptional diagram showing the reading of image-drawn factor elements at the time that the image-drawing processing means 14a processes the divided image-drawing area A. Incidentally, the diagonally shaded areas in the drawing respectively correspond to the divided image-drawing area A.

The image-drawing processing means 14a reads standard image-drawn factor elements corresponding to a scanning line 1 from the standard image-drawn factor elements storing part 13a, image-drawn factor elements corresponding to the scanning line 1 and a height 1 from the height-1 image-drawn factor elements storing part 13b, and image-drawn factor elements corresponding to the scanning line 1 and a height 2 from the height-2 image-drawn factor elements storing part 13c.

Further, the image-drawing processing means 14a reads standard image-drawn factor elements corresponding to a scanning line 2 from the standard image-drawn factor elements storing part 13a, image-drawn factor elements corresponding to a scanning line 2 and a height 1 from the height-1 image-drawn factor elements storing part 13b, and image-drawn factor elements corresponding to the scanning line 2 and a height 2 from the height-2 image-drawn factor elements storing part 13c.

Moreover, the image-drawing processing means 14a reads standard image-drawn factor elements corresponding to a scanning line 3 from the standard image-drawn factor elements storing part 13a, image-drawn factor elements corresponding to the scanning line 3 and a height 1 from the height-1 image-drawn factor elements storing part 13b, and image-drawn factor elements corresponding to the scanning line 3 and a height 2 from the height-2 image-drawn factor elements storing part 13c.

As a result of such reading, the standard image-drawn factor elements 23 and the image-drawn factor elements 21a and 21b are read from the image-drawn factor elements storing means 13 so that image-drawing processing is executed.

Figure 9:
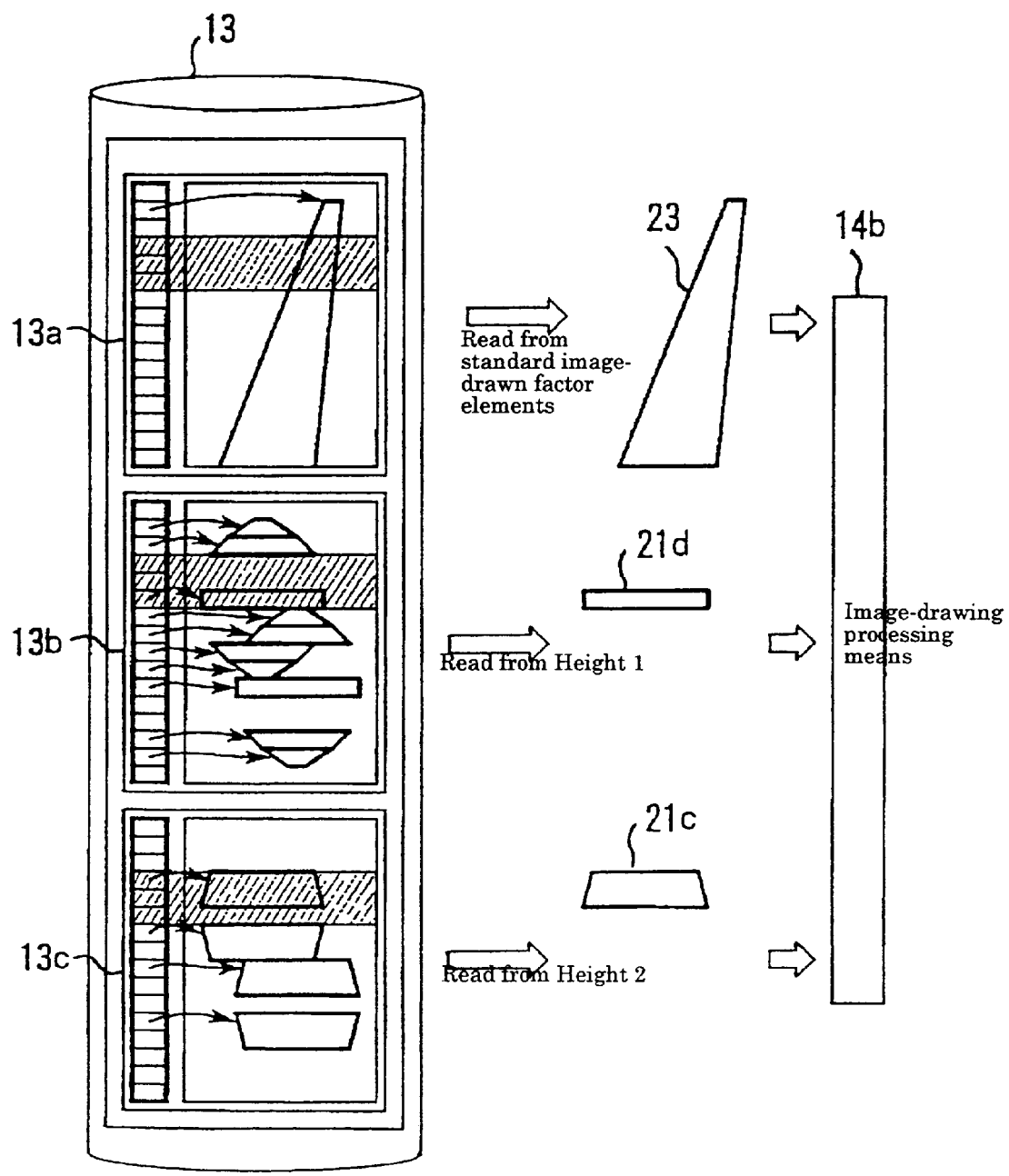
FIG. 9 is a conceptional diagram depicting the reading of image-drawn factor elements at the time that a divided image-drawing area B is processed by an image-drawing processing means.

The image-drawing processing means 14b will next be explained. FIG. 9 is a conceptional diagram showing the reading of image-drawn factor elements at the time that the image-drawing processing means 14b processes the divided image-drawing area B. Incidentally, the diagonally shaded areas in the drawing respectively show the divided image-drawn area B.

The image-drawing processing means 14b initially reads image-drawn factor elements from the standard image-drawn factor elements storing part 13a. To begin with, the image-drawing processing means 14b reads data from the first scanning line in order. At this time, the image-drawing processing means 14b makes a check as to whether the standard image-drawn factor elements intersects the divided image-drawing area B and reads only image-drawn factor elements intersecting the divided image-drawing area B.

Namely, the image-drawing processing means 14b reads standard image-drawn factor elements while making the above check on a scanning line position 1 to a scanning line position 3 corresponding to a position reduced by 1 from the smallest scanning position 4 of the divided image-drawn area B in order. Since the standard image-drawn factor elements 23 exists in a scanning line position 2 and intersects the divided image-drawn area B in this case, the standard image-drawn factor elements 23 is read.

Next, the image-drawing processing means 14b reads image-drawn factor elements from the height-2 image-drawn factor elements storing part 13c. In this case, the image-drawing processing means 14b reads image-drawn factor elements falling under the classification of the height 2 at the position reduced by 1 (corresponding to a value reduced by one unit from the height value 2) from the smallest scanning line position of the divided image-drawn area B, i.e., the scanning line position 3. Since the corresponding image-drawn factor elements is not read because it does not exist in the drawing.

After the completion of such processing, the image-drawing processing means 14b reads standard image-drawn factor elements corresponding to a scanning line 4 from the standard image-drawn factor elements storing part 13a, image-drawn factor elements corresponding to the scanning line 4 and a height 1 from the height-1 image-drawn factor elements storing part 13b, and image-drawn factor elements corresponding to the scanning line 4 and a height 2 from the height-2 image-drawn factor elements storing part 13c.

Next, the image-drawing processing means 14b reads standard image-drawn factor elements corresponding to a scanning line 5 from the standard image-drawn factor elements storing part 13a, image-drawn factor elements corresponding to the scanning line 5 and the height 1 from the height-1 image-drawn factor elements storing part 13b, and image-drawn factor elements corresponding to the scanning line 5 and the height 2 from the height-2 image-drawn factor elements storing part 13c.

Further, the image-drawing processing means 14b reads standard image-drawn factor elements corresponding to a scanning line 6 from the standard image-drawn factor elements storing part 13a, image-drawn factor elements corresponding to the scanning line 6 and a height 1 from the height-1 image-drawn factor elements storing part 13b, and image-drawn factor elements corresponding to the scanning line 6 and a height 2 from the height-2 image-drawn factor elements storing part 13c.

As a result of such reading, the standard image-drawn factor elements 23 and the image-drawn factor elements 21d and 21c are read from the image-drawn factor elements storing means 13 so that image-drawing processing is performed.

As described above, the image-drawing processing means 14b has already read all the image-drawn factor elements required to perform the image-drawing processing of the divided image-drawing area B. Further, since the image-drawing processing means 14b does not need to read image-drawn factor elements other than these and perform other check processes or the like, overhead can be greatly reduced.

Figure 10:
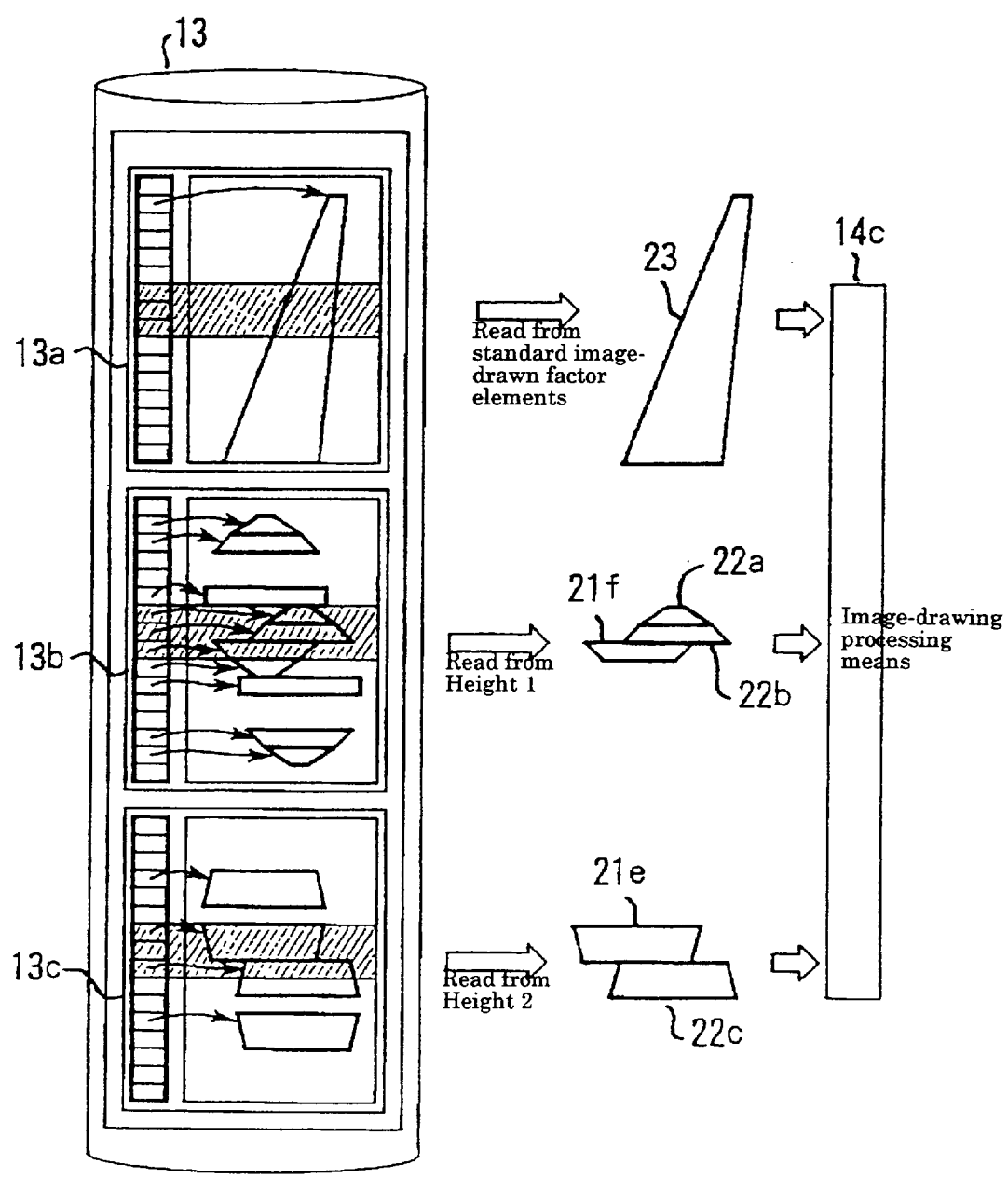
FIG. 10 is a conceptional diagram showing the reading of image-drawn factor elements at the time that a divided image-drawing area C is processed by an image-drawing processing means.

The image-drawing processing means 14c will next be explained. FIG. 10 is a conceptional diagram showing the reading-in of image-drawn factor elements at the time that the image-drawing processing means 14c processes the divided image-drawing area C. Incidentally, the diagonally shaded areas in the drawing respectively correspond to the divided image-drawing area C. Processing to be executed by the image-drawing processing means 14 is basically identical to the processing of the divided image-drawing area B by the image-drawing processing means 14b.

The image-drawing processing means 14c initially reads image-drawn factor elements from the standard image-drawn factor elements storing part 13a. To begin with, the image-drawing processing means 14c reads data from the first scanning line in order. At this time, the image-drawing processing means 14c makes a check as to whether the standard image-drawn factor elements falls within the divided image-drawing area C and reads in only the image-drawn factor elements falling within the divided image-drawing area C.

Namely, the image-drawing processing means 14c reads standard image-drawn factor elements while making the above check on a scanning line position 1 to a scanning line position 6 corresponding to a position reduced by 1 from the smallest scanning position 7 of the divided image-drawn area C in order. Since the standard image-drawn factor elements 23 exists in a scanning line position 2 and is included in the divided image-drawn area C in this case, the standard image-drawn factor elements 23 is eventually read.

Next, the image-drawing processing means 14c reads image-drawn factor elements from the height-2 image-drawn factor elements storing part 13c. In this case, the image-drawing processing means 14c reads image-drawn factor elements falling under the classification of the height 2 at the position reduced by 1 (corresponding to a value reduced by one unit from the height value 2) from the smallest scanning line position 7 of the divided image-drawn area C, i.e., the scanning line position 6. Since the corresponding image-drawn factor elements is not read because it does not exist in the example illustrated in the drawing.

After the completion of such processing, the image-drawing processing means 14c reads standard image-drawn factor elements corresponding to a scanning line 7 from the standard image-drawn factor elements storing part 13a, image-drawn factor elements corresponding to the scanning line 7 and a height 1 from the height-1 image-drawn factor elements storing part 13b, and image-drawn factor elements corresponding to the scanning line 7 and a height 2 from the height-2 image-drawn factor elements storing part 13c.

Next, the image-drawing processing means 14c reads standard image-drawn factor elements corresponding to a scanning line 8 from the standard image-drawn factor elements storing part 13a, image-drawn factor elements corresponding to the scanning line 8 and a height 1 from the height-1 image-drawn factor elements storing part 13b, and image-drawn factor elements corresponding to the scanning line 8 and a height 2 from the height-2 image-drawn factor elements storing part 13c.

Further, the image-drawing processing means 14c reads standard image-drawn factor elements corresponding to a scanning line 9 from the standard image-drawn factor elements storing part 13a, image-drawn factor elements corresponding to the scanning line 9 and a height 1 from the height-1 image-drawn factor elements storing part 13b, and image-drawn factor elements corresponding to the scanning line 9 and a height 2 from the height-2 image-drawn factor elements storing part 13c.

As a result of such reading, the standard image-drawn factor elements 23 and the image-drawn factor elements 22a, 21f, 22b, 21e and 22c are read from the image-drawn factor elements storing means 13 so that image-drawing processing is performed.

As described above, the image-drawing processing means 14c has already read all the image-drawn factor elements required to be subjected to the image-drawing processing of the divided image-drawing area C. Further, since the image-drawing processing means 14c does not need to read image-drawn factor elements other than these and perform other check processes or the like, it is possible to greatly cut down overhead.

Figure 11:
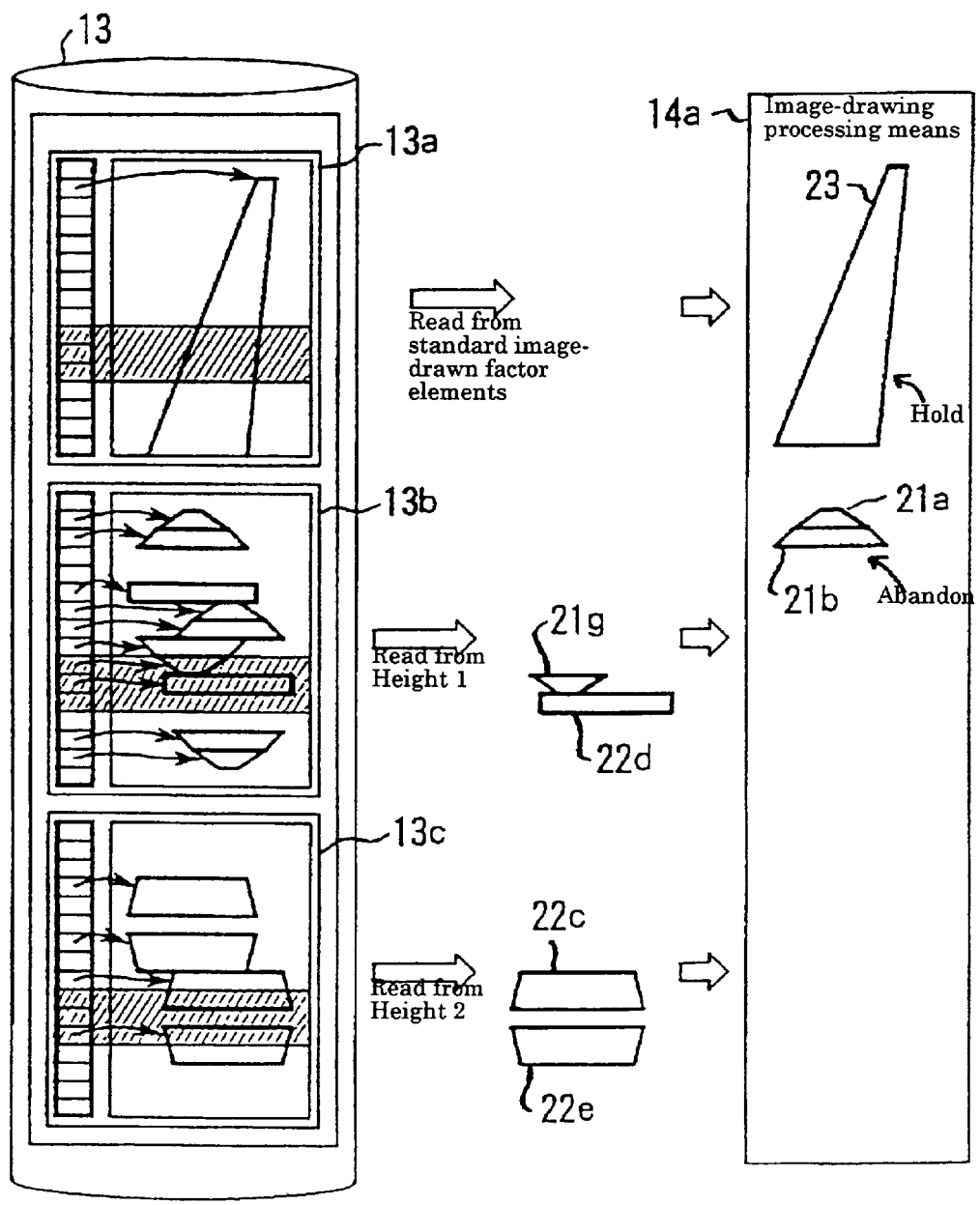
FIG. 11 is a conceptional diagram illustrating the reading of image-drawn factor elements at the time that a divided image-drawing area D is processed by an image-drawing processing means.

A description will next be made of processing on the divided image-drawing area D by the image-drawing processing means 14a when the divided image-drawing area D is assigned to the image-drawing processing means 14a on the assumption that the processing on the divided image-drawing area A, which has been performed by the image-drawing processing means 14a, has been finished in the first place. FIG. 11 is a conceptional diagram showing the reading of image-drawn factor elements at the time that the image-drawing processing means 14a processes the divided image-drawing area D. Incidentally, the diagonally shaded areas in the drawing are respectively equal to the divided image-drawn area D.

The image-drawing processing means 14a stores therein the position of completion of the processing of the processing-terminated divided image-drawing area A, i.e., information about a scanning line position 3 in FIG. 11. The image-drawing processing means 14a makes an inquiry to the image-drawing area allocating means 15.

Thereafter, the image-drawing area allocating means 15 notifies a divided image-drawing area D to be next processed to the image-drawing processing means 14a by use of scanning line position information 10 and 12 on both ends of the image-drawing area D.

Since only standard image-drawn factor elements 23 exists as the image-drawn factor elements lying within the divided image-drawing area D, of the image-drawn factor elements read upon processing of the divided image-drawing area A, the image-drawing processing means 14a holds the standard image-drawn factor elements 23 therein. Since other image-drawn factor elements 21a and 21b are not included in the divided image-drawing area D, they are abandoned prior to the image-drawing processing.

Next, the image-drawing processing means 14a reads standard image-drawn factor elements registered within the standard image-drawn factor elements storing part 13a between the position next to the scanning line position 3 corresponding to the position of completion of the previous processing and the position reduced by 1 from the smallest scanning line position 10 of the divided image-drawing area D, i.e., between a scanning line position 4 and a scanning line position 9. However, no new image-drawn factor elements exist in the standard image-drawn factor elements storing part 13a.

The image-drawing processing means 14a next reads each image-drawn factor elements from the height-2 image-drawn factor elements storing part 13c. In this case, the image-drawing processing means 14a reads image-drawn factor elements corresponding to the position, i.e., the scanning line position 9 reduced by 1 (corresponding to a value reduced by one unit from a height value 2) from the smallest scanning line position 10 of the divided image-drawing area D, and a height 2. In the illustrated example, the corresponding image-drawn factor elements is not read because of its absence.

The image-drawing processing means 14a reads standard image-drawn factor elements corresponding to a scanning line 10 from the standard image-drawn factor elements storing part 13a, image-drawn factor elements corresponding to the scanning line 10 and a height 1 from the height-1 image-drawn factor elements storing part 13b, and image-drawn factor elements corresponding to the scanning line 10 and a height 2 from the height-2 image-drawn factor elements storing part 13c.

Further, the image-drawing processing means 14a reads standard image-drawn factor elements corresponding to a scanning line 11 from the standard image-drawn factor elements storing part 13a, image-drawn factor elements corresponding to the scanning line 11 and a height 1 from the height-1 image-drawn factor elements storing part 13b, and image-drawn factor elements corresponding to the scanning line 11 and a height 2 from the height-2 image-drawn factor elements storing part 13c.

Moreover, the image-drawing processing means 14a reads standard image-drawn factor elements corresponding to a scanning line 12 from the standard image-drawn factor elements storing part 13a, image-drawn factor elements corresponding to the scanning line 12 and a height 1 from the height-1 image-drawn factor elements storing part 13b, and image-drawn factor elements corresponding to the scanning line 12 and a height 2 from the height-2 image-drawn factor elements storing part 13c.

As a result of such reading, the image-drawn factor elements 21g, 22d, 22c and 22e are read from the image-drawn factor elements storing means 13 so that image-drawing processing is performed.

As described above, the image-drawing processing means 14a has already read all the image-drawn factor elements necessary for the image-drawing processing of the divided image-drawing area D. Further, since the image-drawing processing means 14a does not need to read image-drawn factor elements other than these and perform other check processes or the like, it is possible to greatly reduce overhead.

Figure 12:
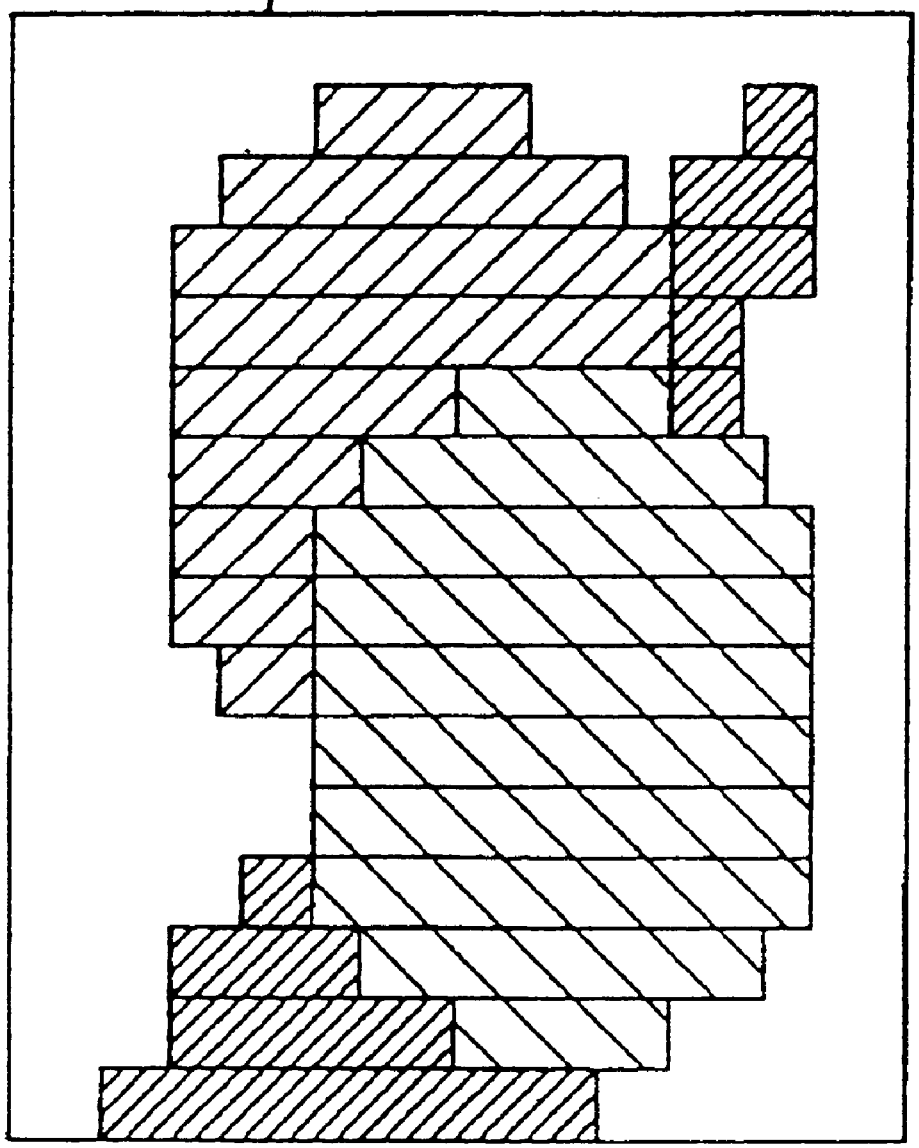
FIG. 12 is a diagram for describing the result of a synthesized output.

A synthesized output result will next be described. FIG. 12 is a diagram showing a synthesized output result 17a. The image-drawn sample 20 is drawn or plotted by the image-drawing processing means 14a through 14c and synthesized and outputted as shown in the drawing.

Figure 13:
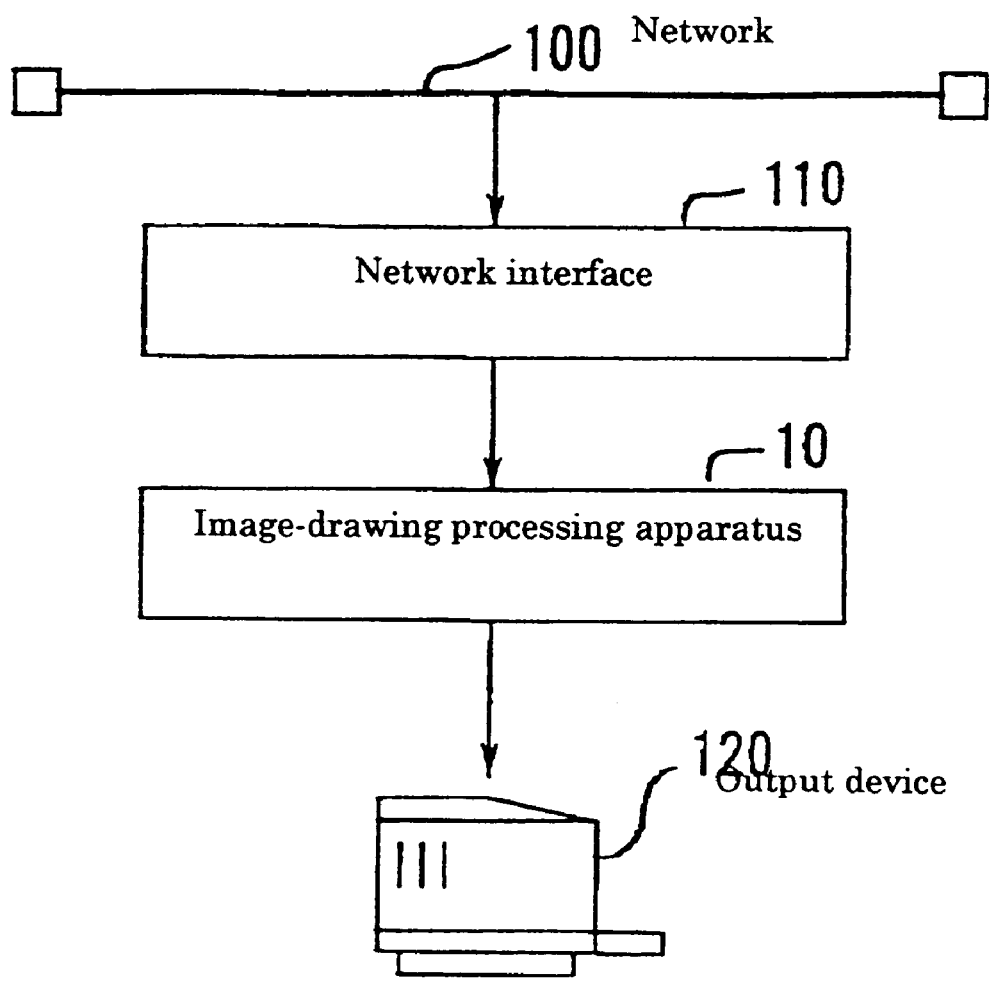
FIG. 13 is a diagram showing one example of a system to which an image-drawing processing apparatus is applied.

A system to which the image-drawing processing apparatus 10 according to the present invention is applied, will next be explained. FIG. 13 is a diagram showing one example of the system to which the image-drawing processing apparatus 10 is applied. The present system has the image-drawing processing apparatus 10 connected thereto via a network interface 110 coupled to a network 100. Further, an output device 120 for outputting the result of processing supplied from the image-drawing processing apparatus 10 is connected to the image-drawing processing apparatus 10.

The operation of the system is as follows: Image-drawing output data is sent from an unillustrated client computer through the network 100, or a leased line or a radio device. The image-drawing output data is received and processed by the image-drawing processing apparatus 10 through an interface device of the network interface 110.

Thereafter, the processed data is transferred to the output device 120 so that images are reproduced on a medium such as paper, a film, a memory device or the like used to display a raster image.

Figure 14:
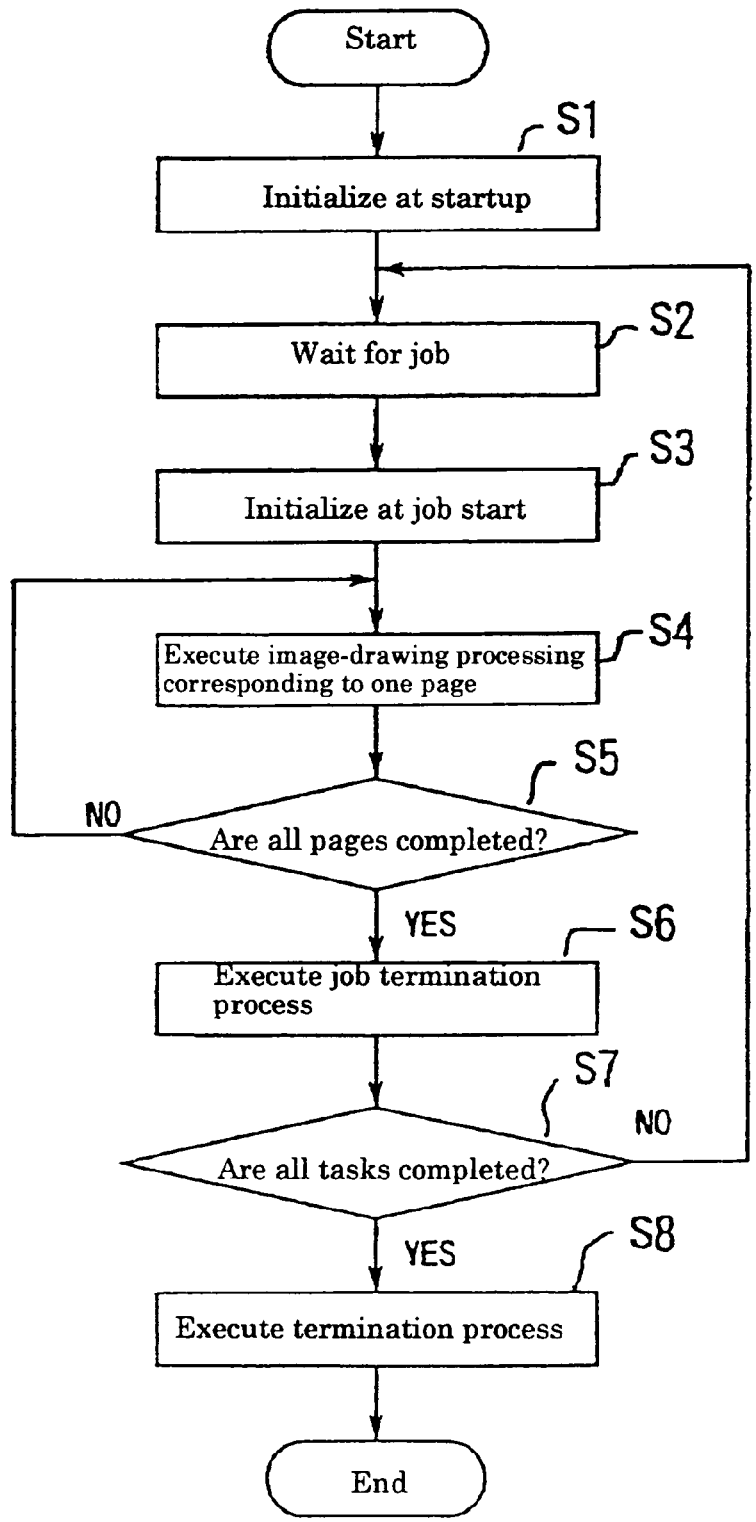
FIG. 14 is a flowchart for describing the entire processing procedure of the image-drawing processing apparatus.

The entire processing operation of the image-drawing processing apparatus 10 at job levels will next be described. FIG. 14 is a flowchart for describing the entire processing procedure of the image-drawing processing apparatus 10.

[S1] The image-drawing processing apparatus 10 runs initialization at start-up, e.g., initialization such as memory management or the like.

[S2] The image-drawing processing apparatus 10 enters into a job waiting state.

[S3] When a job is accepted by and image-drawn data is inputted to the image-drawing processing apparatus 10, the image-drawing processing apparatus 10 runs initialization at a job start. The image-drawing processing apparatus 10 performs, e.g., initialization or the like based on settings described in input image-drawn data.

[S4] The image-drawing processing apparatus 10 performs image-drawing processing for each page.

[S5] When the image-drawing processing on all the pages or all the specified pages related to the job is terminated or completed, the image-drawing processing apparatus 10 proceeds to Step S6. If not so in Step S5, then the image-drawing processing apparatus 10 is returned to Step S4.

[S6] The image-drawing processing apparatus 10 performs a job termination process.

[S7] When the processing of all the tasks is terminated, the image-drawing processing apparatus 10 proceeds to Step S8. If the answer is found to be NO in Step S7, then the image-drawing processing apparatus 10 is returned to Step S2.

[S8] The image-drawing processing apparatus 10 performs a termination process such as release or freedom of the acquired memory areas or the like.

Figure 15:
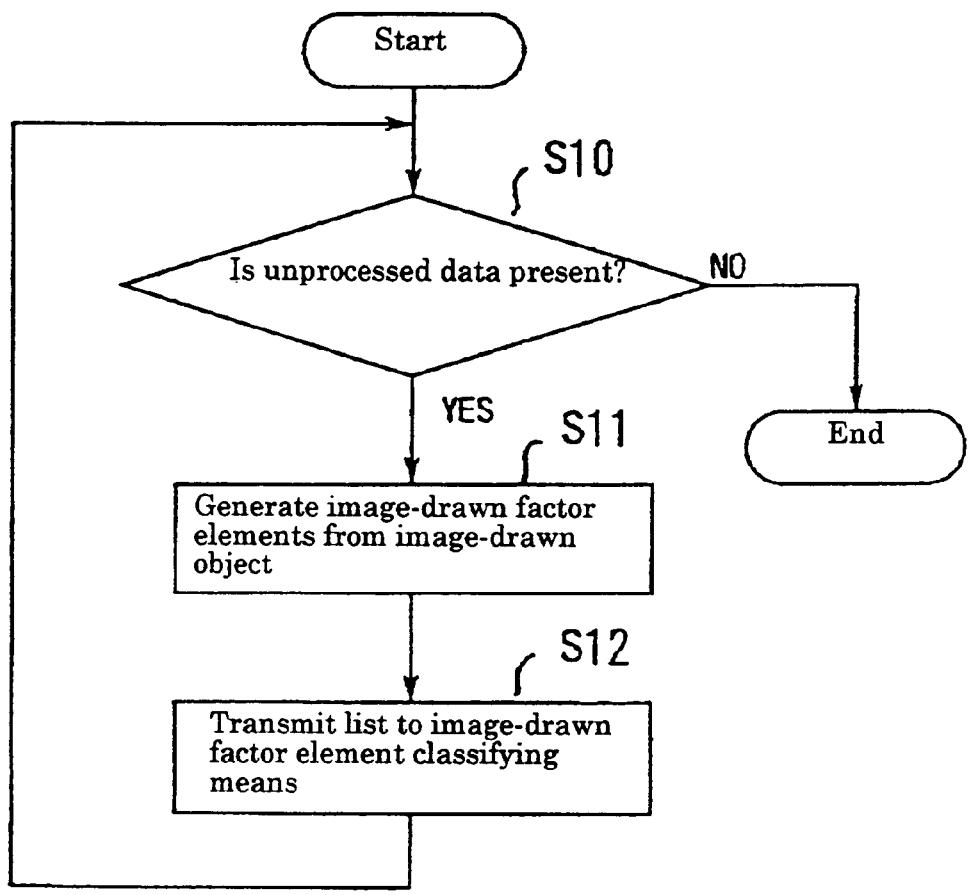
FIG. 15 is a flowchart for describing a processing procedure of a list generating means.

The respective means of the image-drawing processing apparatus 10 will next be described in detail. FIG. 15 is a flowchart for describing a processing procedure of the list generating means 11.

[S10] When image-drawn objects to be processed, which constitutes one page, remains, the list generating means 11 goes to Step S11. If the answer is found to be NO in Step S10, then the list generating means 11 ceases processing.

[S11] The list generating means 11 generates image-drawn factor elements from the image-drawn objects and creates a list thereof.

[S12] The list generating means 11 transmits the list of the image-drawn factor elements to the image-drawn factor elements sorting means 12. The list generating means 11 transmits image-drawn factor elements to the image-drawn factor elements sorting means 12 one by one (one as the contents of the list), transmits them by plural numbers (several tens to hundreds as the contents of the list) thereto or collectively transmits all the image-drawn factor elements (one page as the contents of the list) thereto, for example.

A description will next be made of a data structure of image-drawn factor elements produced by the list generating means 11. FIG. 16 is a diagram showing a data structure of image-drawn factor elements. Image-drawn factor elements 11a for representing an image-drawing area by a representation of a trapezoid having two sides parallel to the scanning line direction, and its data structure 11b are shown in the drawing.

A Y coordinate is taken in the sub-scanning line direction for the image-drawing processing and an X coordinate is taken in the scanning line direction for the image-drawing processing. In this condition, the positions on the image-drawing area are represented in an X-Y coordinate system.

The data structure 11b stores therein values (ATTR) for painting out or filling colors or the like, values (PRIO) of color-filling priorities for controlling the sequence of overwriting, etc., in addition to values (YMIN, YMAX, X1, X2, DX1 and DX2) related to image-drawing areas. As an additional plus, the data structure 11b might be additionally provided with a pointer area for pointing addresses for other data according to stored forms.

Various forms may be given as the representation of each filling area by the trapezoidal data. However, one example thereof is illustrated in FIG. 16. A trapezoidal area can be at least defined by a maximum value YMAX of a Y coordinate value and a minimum value YMIN thereof illustrated in the drawing, an X coordinate value X1 at the position of the minimum value of the Y coordinate value on the left side thereof, an incremented value DX1 of the X coordinate value on the left side thereof at the time that the Y coordinate value is increased by a unit amount, an X coordinate value X2 at the position of the minimum value of the Y coordinate value on the right side thereof, and an incremented value DX2 of the X coordinate value on the right side thereof at the time that the Y coordinate value is increased by a unit amount.

Incidentally, the image-drawn factor elements representing the filling area given by the trapezoidal representation is used as the image-drawn factor elements for simplicity of illustration in the present invention. It is however unnecessary to present the image-drawn factor elements in the form of the representation of the trapezoid having the two sides parallel to the main-scanning direction.

If there are adopted represented forms, indicative of the boundaries of color-filling areas or representations such as the boundaries of the color-filling areas and capable of specifying coordinate values and sizes in a coordinate system of an image-drawing area, such as a polygonal representation based on a sequence of points and a vector representation, a sequence of line segment representation including or excluding curved lines, a vector representation comprised of straight-line segments alone, a representation based on line-segment row pairs in which the opposed line-segment rows are related to one another, a representation in which an image-drawing area is divided into, e.g., triangle, rectangular or trapezoidal form, etc., then they fall within the range of the image-drawn factor elements employed in the present invention even if any of them is used.

Figure 17:
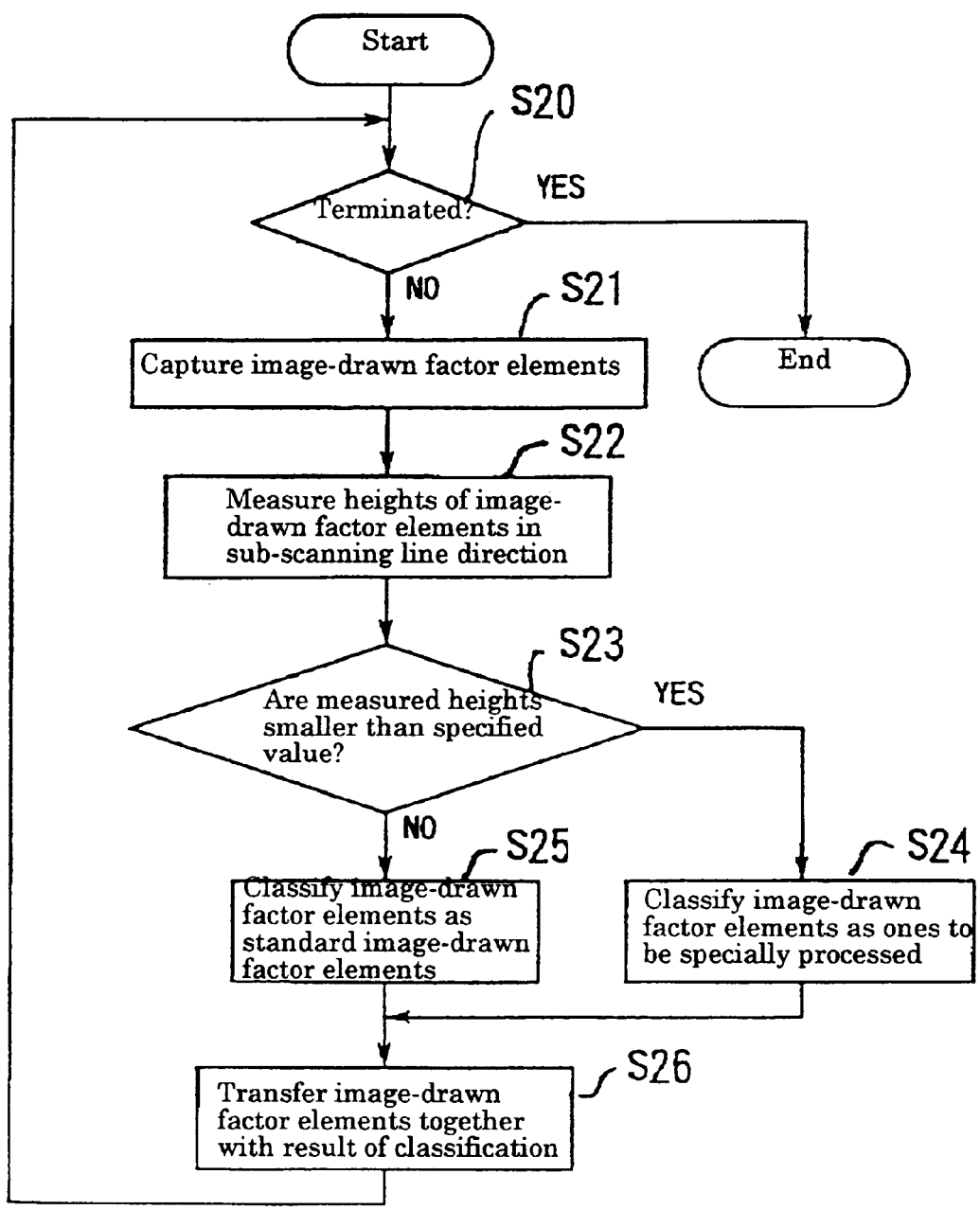
FIG. 17 is a flowchart for describing a processing procedure of an image-drawn factor element sorting means.

The image-drawn factor elements sorting means 12 will next be explained. FIG. 17 is a flowchart for describing a processing procedure of the image-drawn factor elements sorting means 12.

[S20] When classifying processing still remains, the image-drawn factor elements sorting means 12 proceeds to Step S21. If the answer is found to be NO in Step S20, then the image-drawn factor elements sorting means 12 terminates or ends its processing.

[S21] The image-drawn factor elements sorting means 12 captures each of image-drawn factor elements.

[S22] The image-drawn factor elements sorting means 12 measures the height of the image-drawn factor elements in the sub-scanning line direction. Namely, the image-drawn factor elements sorting means 12 measures the height extending in the direction normal to the direction of division of an image-drawing area.

[S23] When the measured height is smaller than the previously specified reference value, the image-drawn factor elements sorting means 12 proceeds to Step S24. If the answer is found to be NO in Step S23, then the image-drawn factor elements sorting means 12 goes to Step S25.

[S24] The image-drawn factor elements sorting means 12 classifies the image-drawn factor elements as ones to be specially processed. In regard to the image-drawn factor elements classified as the ones to be specifically processed, further detailed classification (which does not need to take the same classifying method as the first classifying method) or similar classification maybe performed hierarchically. There may be cases in which, for example, image-drawn factor elements each having a height of a given reference value or less are re-classified according to the number of sub-scanning lines affected by the image-drawn factor elements.

[S25] The image-drawn factor elements sorting means 12 classifies each captured image-drawn factor elements as standard image-drawn factor elements.

[S26] The image-drawn factor elements sorting means 12 transfers the image-drawn factor elements to the image-drawn factor elements storing means 13 together with the result of classification.

Figure 18:
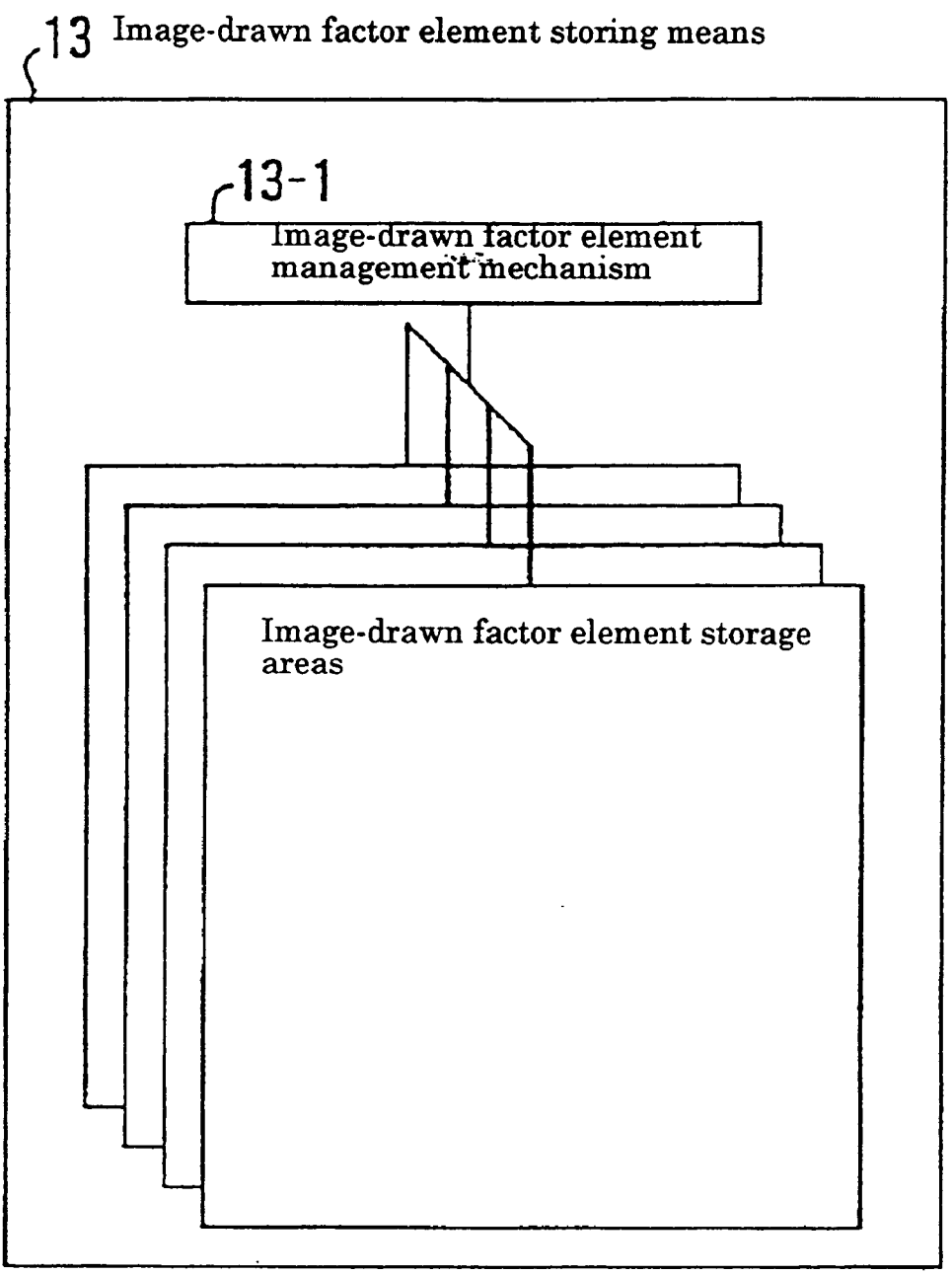
FIG. 18 is a diagram showing one example of an internal configuration of an image-drawn factor elements storing means.
Figure 19:
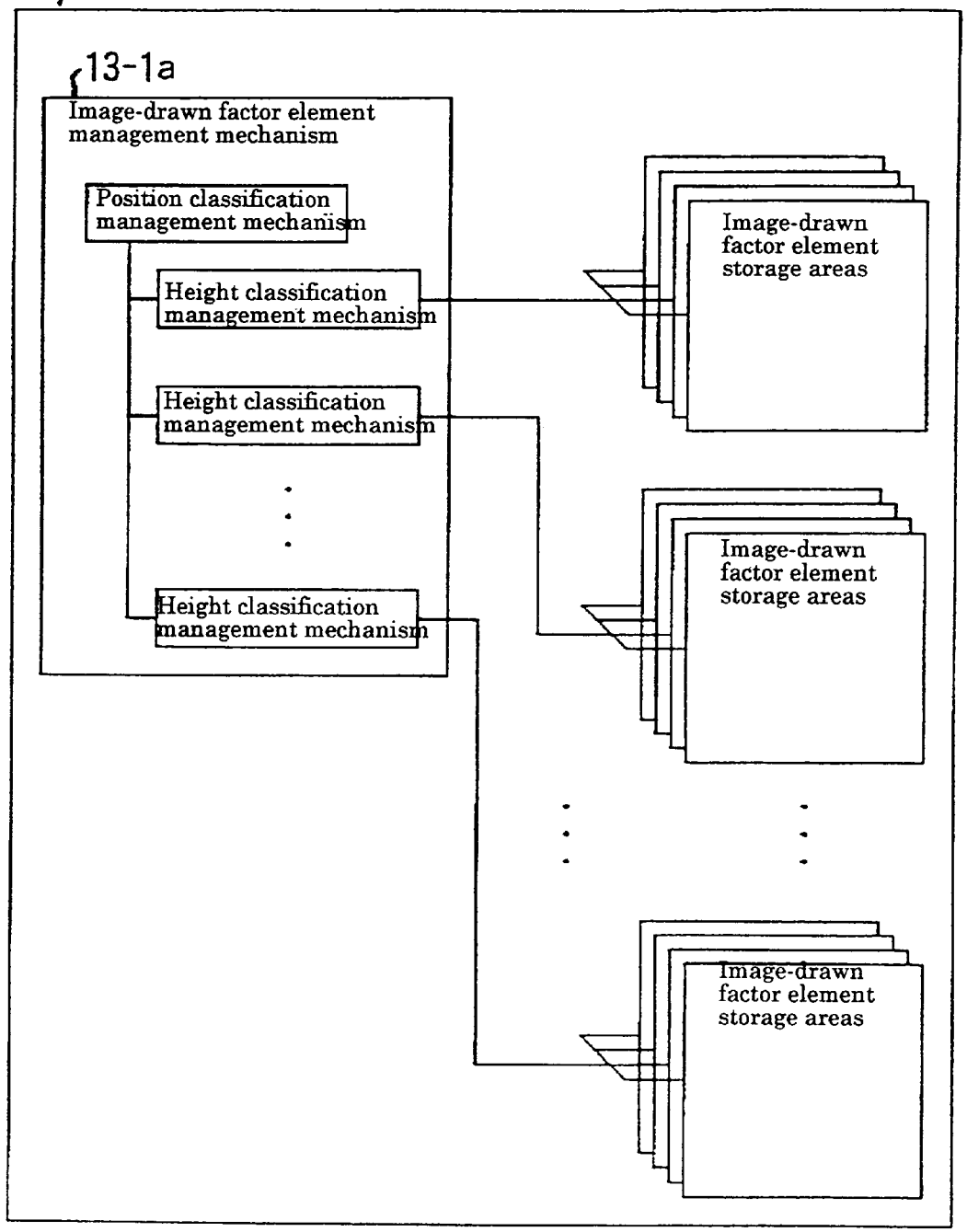
FIG. 19 is a diagram illustrating one example of a hierarchical storage configuration of the image-drawn factor elements storing means.

The image-drawn factor elements storing means 13 will next be described. FIG. 18 is a conceptional diagram showing one example of an internal structure of the image-drawn factor elements storing means 13. FIG. 19 is a diagram showing one example of a hierarchical storage structure of the image-drawn factor elements storing means 13. The same drawing shows that classification by the positions of image-drawn factor elements and classification by their heights are hierarchically made.

The image-drawn factor elements storing means 13 includes image-drawn factor elements management mechanism 13-1. The image-drawn factor elements management mechanism 13-1 manages image-drawn factor elements so as to correspond to reference values according to classifications. When the image-drawn factor elements are stored in the image-drawn factor elements storing means 13, they may be continuously stored therein or discontinuously stored therein.

If, for example, the image-drawn factor elements are classified according to the heights in the sub-scanning line direction, then they are stored at positions different for every heights in the sub-scanning line direction or in accordance with methods different every heights in the sub-scanning line direction, and arranged so that data can be taken out every classifications.

Further, the image-drawn factor elements may be stored in storage areas different according to classifications or a link may be provided so that they can be traced every classifications by use of a list structure. Alternatively, they may be mapped according to classifications or every combinations of classifications by use of a hash function or the like.

When the image-drawn factor elements are classified into the two types of the position and height in the sub-scanning direction, it is unnecessary to necessarily prepare the storage areas different from each other every positions and heights. As an alternative to this, the position and height are inputted as parameters and allowed to temporarily pass through a function for outputting one numerical value (corresponding to an entry), after which each storage area may be accessed.

It is unnecessary to necessarily use a function for feeding back values different every combinations of the positions and heights when such a function computation is made. If the position and height are different from each other, then such a function as to feed back values different in most cases on a probability basis may be used.

In order to achieve a further effective implementation, the stored image-drawn factor elements may be configured so that a list of image-drawn factor elements required be directly taken out without having to use a complex search with both coordinate values such as position coordinates in the sub-scanning line direction and classifications as keys.

Figure 20:
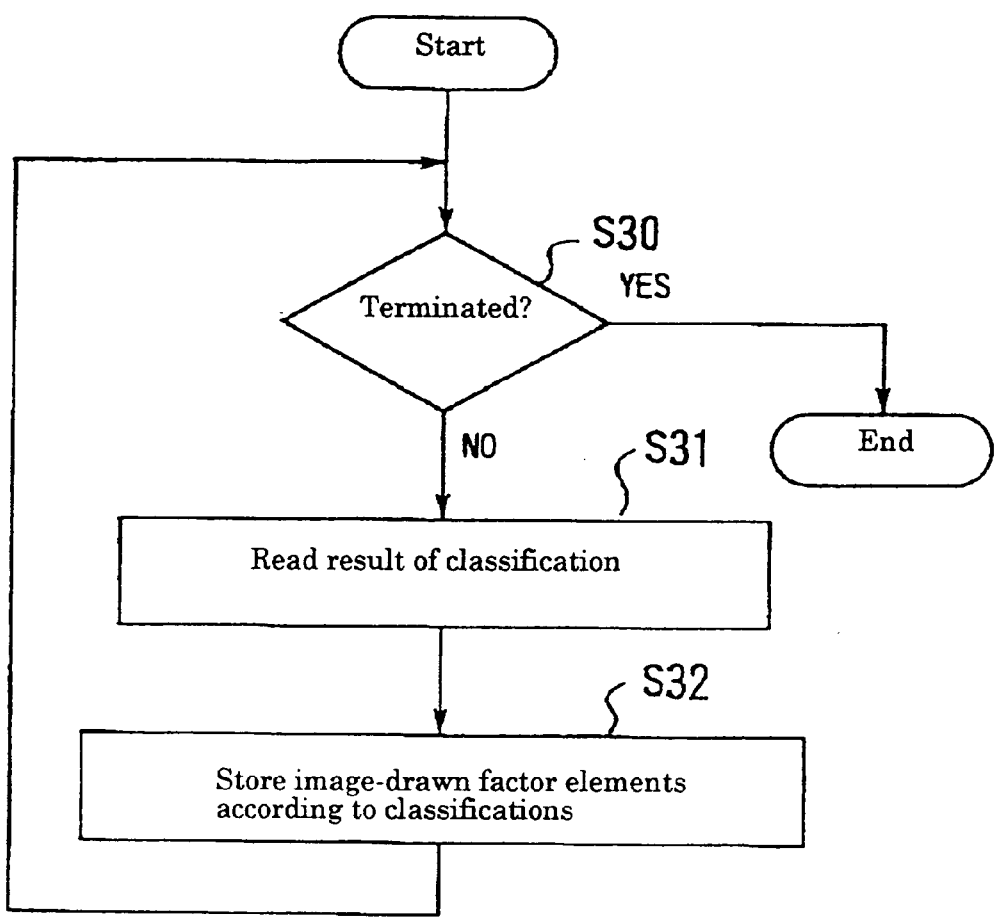
FIG. 20 is a flowchart for describing a storage processing procedure of the image-drawn factor elements storing means.

A storage processing procedure of the image-drawn factor elements storing means 13 will next be explained. FIG. 20 is a flowchart for describing the storage processing procedure of the image-drawn factor elements storing means 13.

[S30] If the storage processing is not yet finished, then the image-drawn factor elements storing means 13 goes to Step S31. If not so, then the storage processing is ended.

[S31] When image-drawn factor elements are inputted, the image-drawn factor elements storing means 13 reads the result of classification of the image-drawn factor elements.

[S32] The image-drawn factor elements storing means 13 stores therein the image-drawn factor elements according to the classifications.

Figure 21:
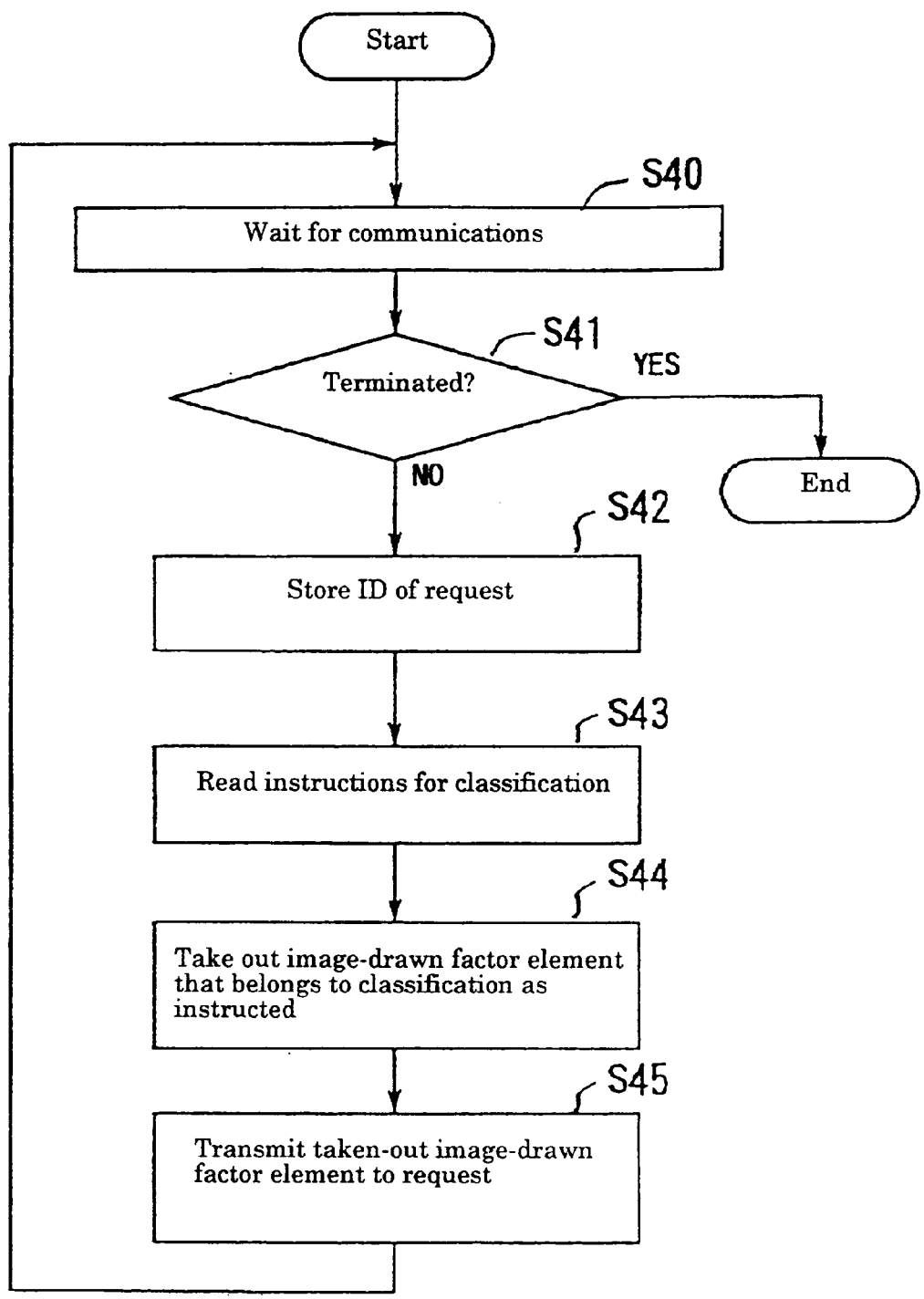
FIG. 21 is a flowchart for describing a processing procedure at image-drawn factor element reading.

A mutual processing procedure between the image-drawn factor elements storing means 13 and the image-drawn factor elements transfer controlling means 16 will next be explained. FIG. 21 is a flowchart for describing a processing procedure at reading of each image-drawn factor elements.

[S40] The image-drawn factor elements storing means 13 waits for communications from the image-drawing processing means 14*a* through 14*n*.

[S41] If the image-drawn factor elements storing means 13 receives a notification of termination of processing on one page, then it ends its processing. If a command for a request of image-drawn factor elements is issued, then the image-drawn factor elements storing means 13 goes to Step S42.

[S42] The image-drawn factor elements transfer controlling means 16 temporarily stores information enough to transfer data to the request, i.e., an ID or address uniquely indicative of the request, or addresses lying within local storage devices in the image-drawing processing means each corresponding to the request, or addresses in storage areas that the image-drawing processing means corresponding to the request can refer to.

[S43] The image-drawn factor elements transfer controlling means 16 reads instructions for classifications required for the image-drawn factor elements.

[S44] The image-drawn factor elements transfer controlling means 16 takes out image-drawn factor elements from the image-drawn factor elements storing means 13.

[S45] The image-drawn factor elements transfer controlling means 16 transmits the taken-out image-drawn factor elements to the corresponding image-drawing processing means corresponding to the request.

Figure 22:
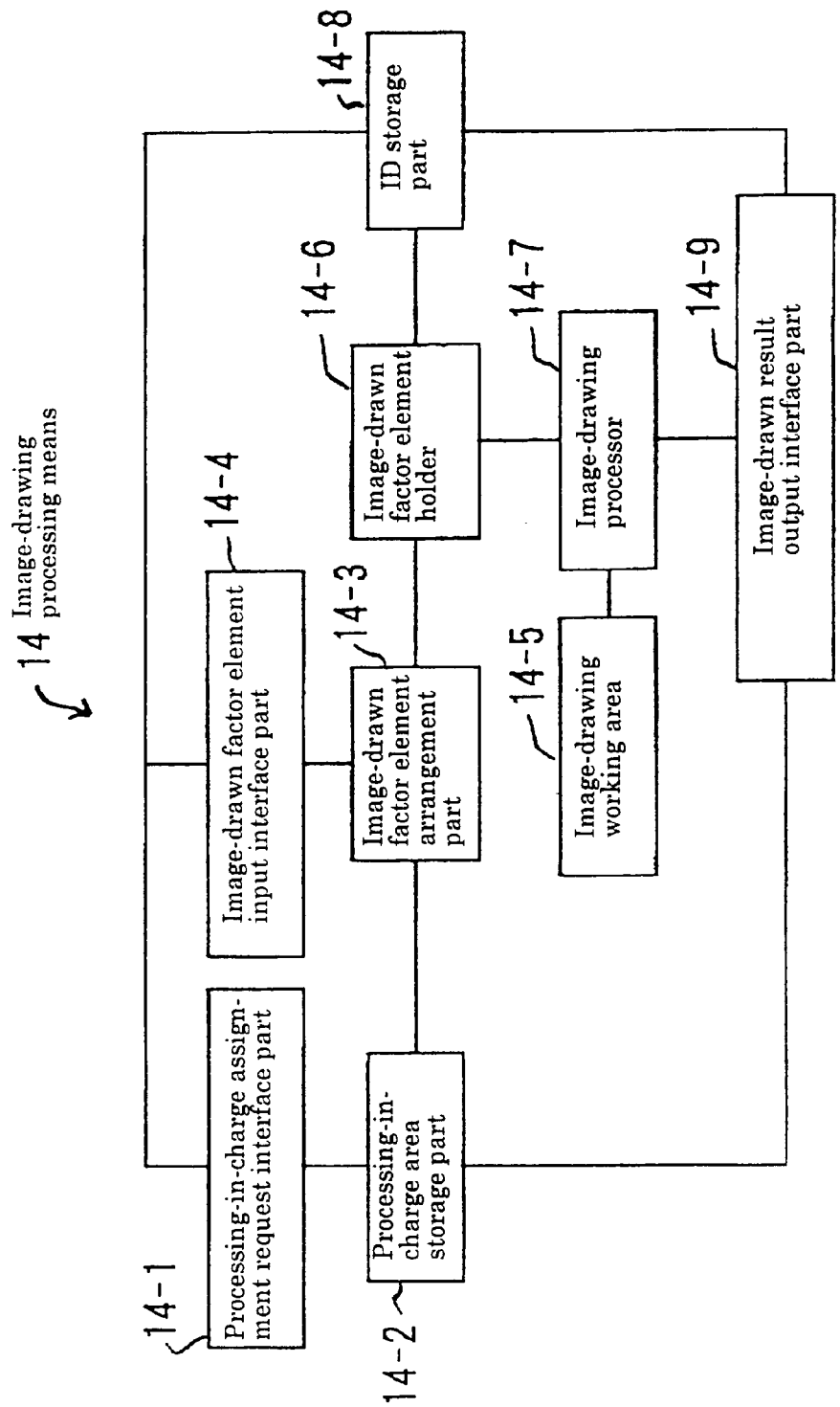
FIG. 22 is a diagram showing a detailed configuration of an image-drawing processing means.

The image-drawing processing means 14 will next be described. FIG. 22 is a diagram showing a detailed structure of the image-drawn processing means 14. A processing-in-charge assignment request interface part 14-1 performs processing for interfacing to the image-drawing area allocating means 15. Further, the processing-in-charge assignment request interface part 14-1 transmits information stored in an ID storage part 14-8 therethrough and receives information about the assigned divided image-drawing area therein so as to allow a processing-in-charge area storage part 14-2 to store the information.

Image-drawn factor elements arrangement part 14-3 refers to the information stored in the processing-in-charge area storage part 14-2 to thereby partly abandon data stored in image-drawn factor elements storage part or holder 14-6 and reads the corresponding image-drawn factor elements from the image-drawn factor elements storing means 13 through image-drawn factor elements input interface part 14-4 so as to cause the image-drawn factor elements holder 14-6 to hold the read image-drawn factor elements.

An image-drawing processor 14-7 performs image-drawing processing on the image-drawn factor elements held in the image-drawn factor elements holder 14-6 by use of an image-drawing working area 14-5 and transfers the result of processing to the synthesizing and outputting means 17 through an image-drawn result output interface part 14-9.

When the respective interface parts communicate with components lying outside the image-drawing processing means 14, the ID storage part 14-8 is connected to the respective interface parts to be ready for the need for transferring information used to identify each individual image-drawing processing means 14. However, when other components connected via the interface parts do not need to directly discriminate between the individual image-drawing processing means 14, the ID storage part 14-8 does not necessarily require connections to all the interface parts.

Further, when the image-drawn factor elements arrangement part 14-3 reads image-drawn factor elements through the image-drawn factor elements input interface part 14-4, it refers to the information stored in the processing-in-charge area storage part 14-2 to thereby determine the corresponding classification for providing instructions for a request of the image-drawn factor elements. After the reference value indicative of the classification has been determined by the image-drawn factor elements arrangement part 14-3, the image-drawn factor elements arrangement part 14-3 requests the image-drawn factor elements.

Figure 23:
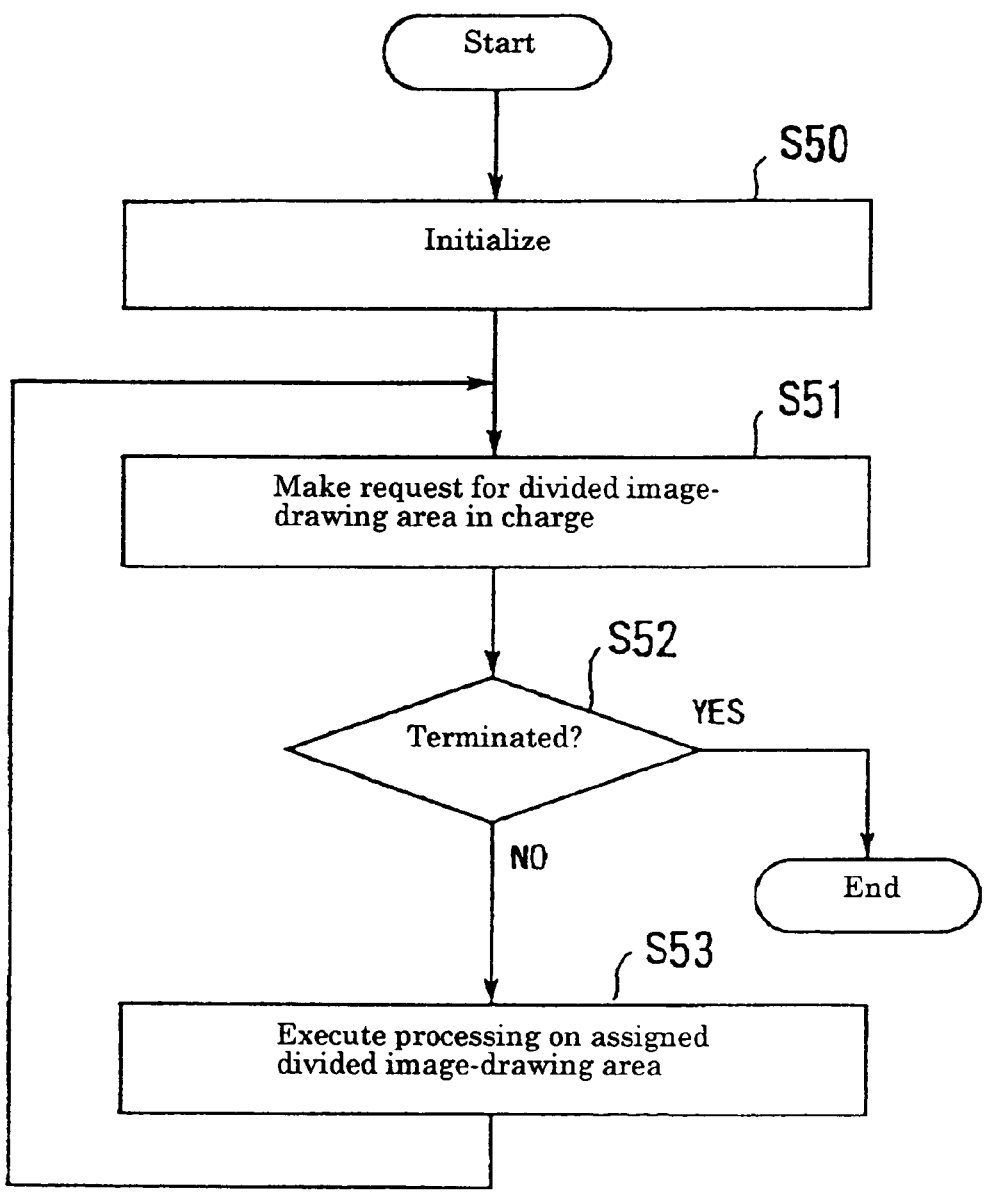
FIG. 23 is a flowchart for describing processing procedures of image-drawing processing means.

Processing operations of the image-drawing processing means 14*a* through 14*n* will next be explained. FIG. 23 is a flowchart for describing processing procedures of the image-drawing processing means 14*a* through 14*n*.

[S50] The image-drawing processing means 14*a* through 14*n* are initialized.

[S51] The image-drawing processing means 14*a* through 14*n* respectively make requests for divided image-drawing areas in charge to the image-drawing area allocating means 15.

[S52] The image-drawing processing means 14*a* through 14*n* respectively repeat the image-drawing processing on the assigned divided image-drawing areas until the termination of processing on one page is notified to them. If the answer is found to be NO in S52, then the image-drawing processing means 14a through 14n go to Step S53.

[S53] The image-drawing processing means 14a through 14n perform the image-drawing processing on the assigned divided image-drawing areas respectively.

Figure 24:
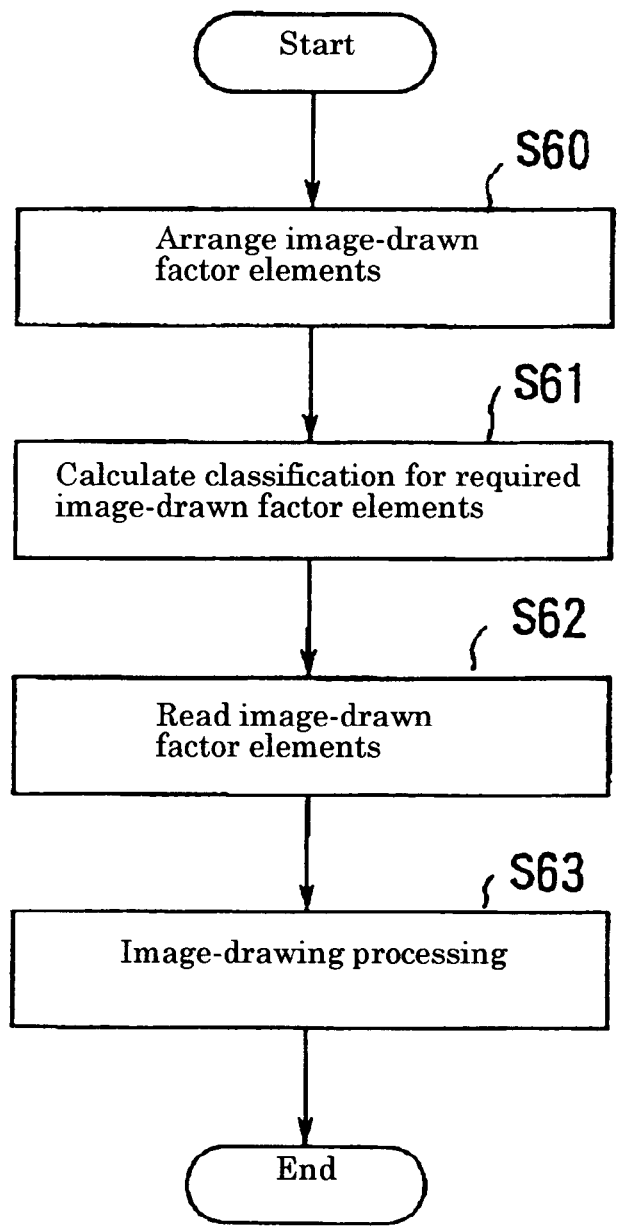
FIG. 24 is a flowchart for describing a processing procedure to be executed for each divided image-drawing area by an image-drawing processing means.

Processes of the image-drawing processing means 14a through 14n to be executed every divided image-drawing areas will next be described. FIG. 24 is a flowchart for describing processing procedures of the image-drawing processing means 14a through 14n every divided image-drawing areas.

[S60] The image-drawing processing means 14a through 14n arrange image-drawn factor elements. Namely, each of the image-drawing processing means 14a through 14n determines whether the image-drawn factor elements held in the image-drawn factor elements holder 14-6 relates to the image-drawing processing within the divided image-drawing area in charge under processing, e.g., the image-drawn factor elements is associated with the divided image-drawing area.

[S61] The image-drawing processing means 14a through 14n respectively calculate classifications for the required image-drawn factor elements. Namely, each of the image-drawing processing means determines into which classification the registered image-drawn factor elements should be read. The image-drawing processing means determines instructions for reading, e.g., the image-drawn factor elements corresponding to the scanning line positions 1 to 6 falling under the standard classification and the image-drawn factor elements corresponding to the scanning line positions 4 to 6 falling under the classification of the height 2 or less.

[S62] The image-drawing processing means 14a through 14n read image-drawn factor elements respectively.

[S63] The image-drawing processing means 14a through 14n perform image-drawing processing respectively.

Figure 25:
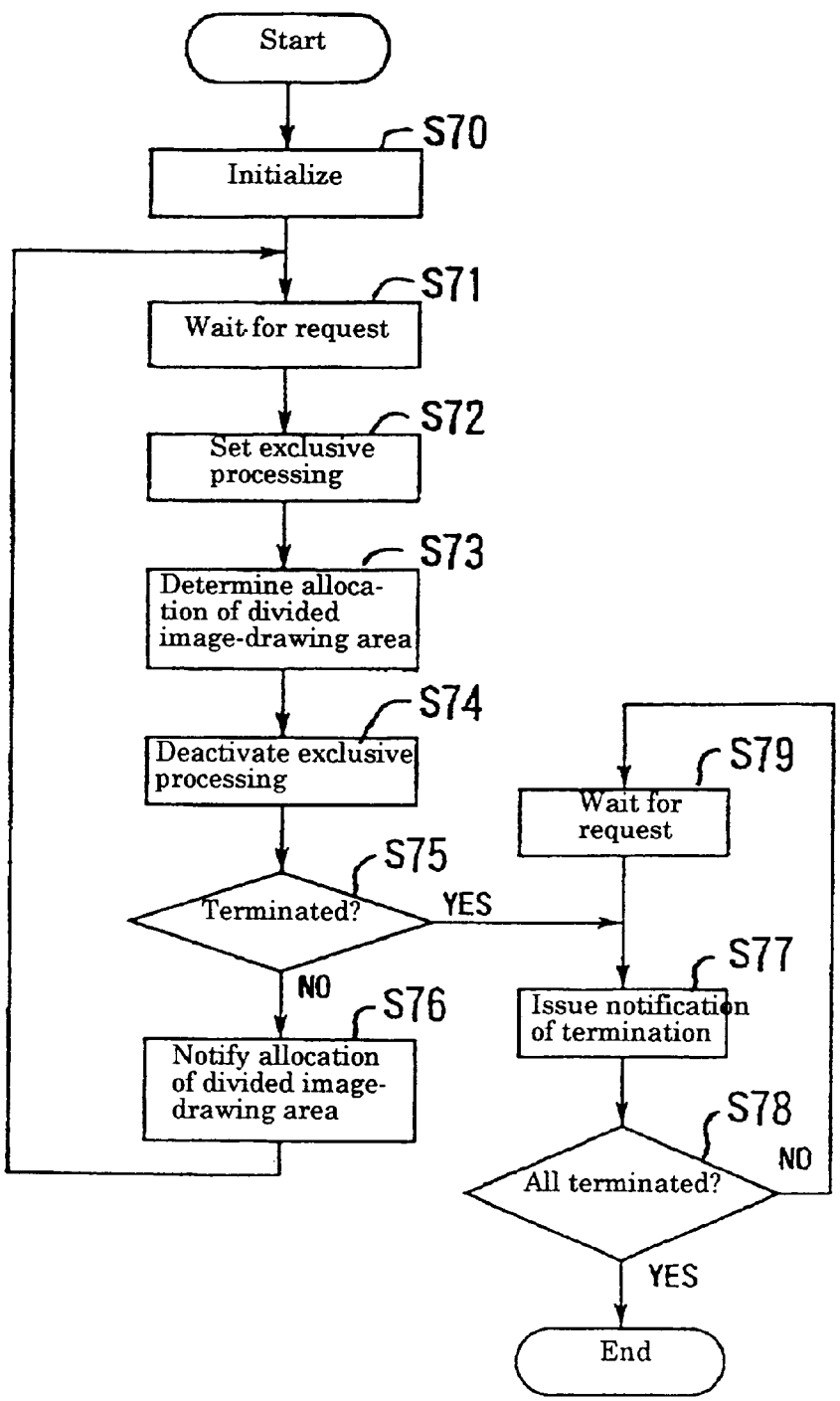
FIG. 25 is a flowchart for describing a processing procedure of an image-drawing area allocating means.

The image-drawing area allocating means 15 will next be explained. FIG. 25 is a flowchart for describing a processing procedure of the image-drawing area allocating means 15.

[S70] The image-drawing area allocating means 15 performs its initialization.

[S71] The image-drawing area allocating means 15 waits for requests issued from the image-drawing processing means 14a through 14n.

[S72] The image-drawing area allocating means 15 sets exclusive processing to protect the processing from requests or the like issued from other image-drawing processing means.

[S73] The image-drawing area allocating means 15 determines the allocation of a divided image-drawing area.

[S74] The image-drawing area allocating means 15 frees the setting of the exclusive processing.

[S75] When the determination of the allocation of all the divided image-drawing areas is terminated, the image-drawing area allocating means 15 goes to Step S77. If the answer is found to be NO in Step S75, then the image-drawing area allocating means 15 proceeds to Step S76.

[S76] The image-drawing area allocating means 15 notifies information about the determined divided image-drawing areas to the image-drawing processing means each corresponding to the request and thereafter returns to Step S71.

[S77] The image-drawing area allocating means 15 issues a notification of termination to the image-drawing processing means in response to the requests issued from all the image-drawing area allocating means.

[S78] When the notification is not yet completed, the image-drawing area allocating means 15 goes to Step S79. If the answer is found to be NO in Step S78, then the image-drawing area allocating means 15 ends its processing.

[S79] The image-drawing area allocating means 15 is returned to a state of being waiting for requests issued from the image-drawing processing means.

Figure 26:
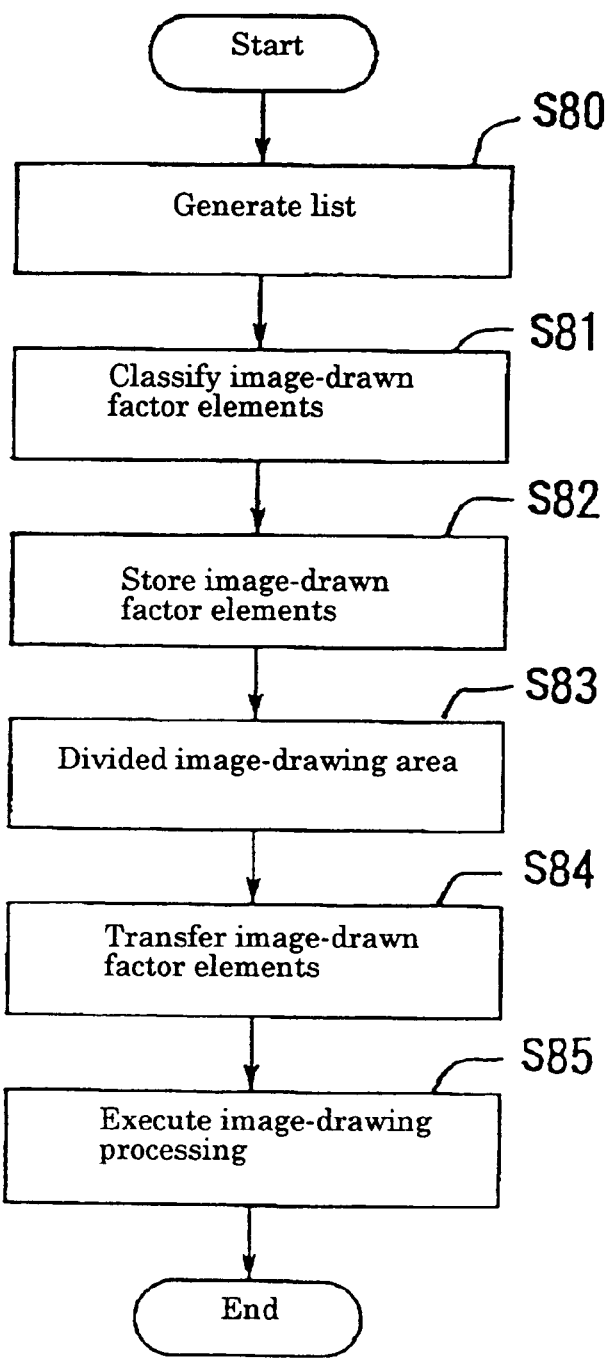
FIG. 26 is a flowchart for describing a procedure for executing an image-drawing processing method according to the present invention.

A method of executing or performing image-drawing processing, according to the present invention will next be explained. FIG. 26 is a flowchart for describing a processing procedure of the image-drawing processing method according to the present invention.

[S80] A list of image-drawn factor elements constituting image-drawn objects is generated.

[S81] The image-drawn factor elements are classified by reference values constant to information about the lengths of the image-drawn factor elements constituting the list.

[S82] The classified image-drawn factor elements are stored so as to correspond to the reference values.

[S83] An image-drawing area is divided into pieces.

[S84] The image-drawn factor elements necessary for image-drawing processing of each divided image-drawing area are transferred while being associated with the reference values. Upon their transfer, image-drawn factor elements completely included within an image-drawing area as well as image-drawn factor elements which are partly included within the image-drawing area and have the length information less than or equal to the reference values, are transferred.

[S85] Image-drawing processing is effected on the transferred image-drawn factor elements.

A description will next be made of mutually-related overheads between the image-drawing processing apparatus 10 of the present invention and a conventional apparatus for simply dividing an image-drawing area and performing parallel image-drawing processing on the divided areas.

Figure 27:
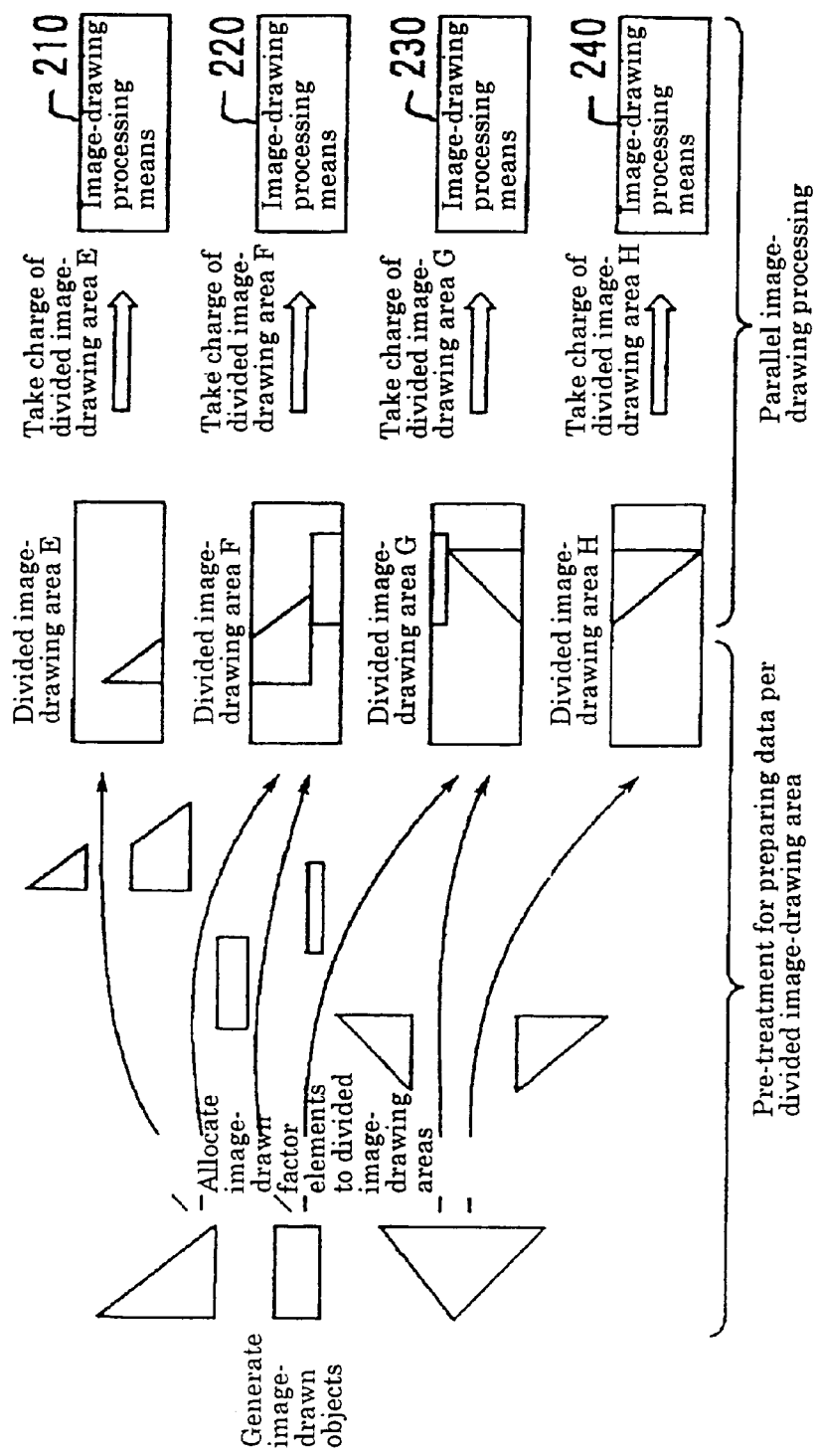
FIG. 27 is a diagram for describing a summary of operation of a conventional apparatus.

FIG. 27 is a diagram showing a summary of the operation of the conventional apparatus. Image-drawing processing means 210, 220, 230, and 240 respectively take charge of a divided image-drawing area E, a divided image-drawing area F, a divided image-drawing area G and a divided image-drawing area H and perform image-drawing processing on them in parallel.

Before the image-drawing processing of these image-drawing processing means, the conventional apparatus has performed pre-treatment for making a check as to which divided image-drawing area includes respective image-drawn factor elements produced from input data and distributing the image-drawn factor elements and thereafter carried out their image-drawing processing in parallel.

In the conventional case as described above, a step of executing the pre-treatment for arranging the image-drawn factor elements every divided image-drawing areas exist before the parallel image-drawing processing. Therefore, the time required to execute the pre-treatment step results in large overhead, thus causing a hindrance to speedup.

Figure 28:
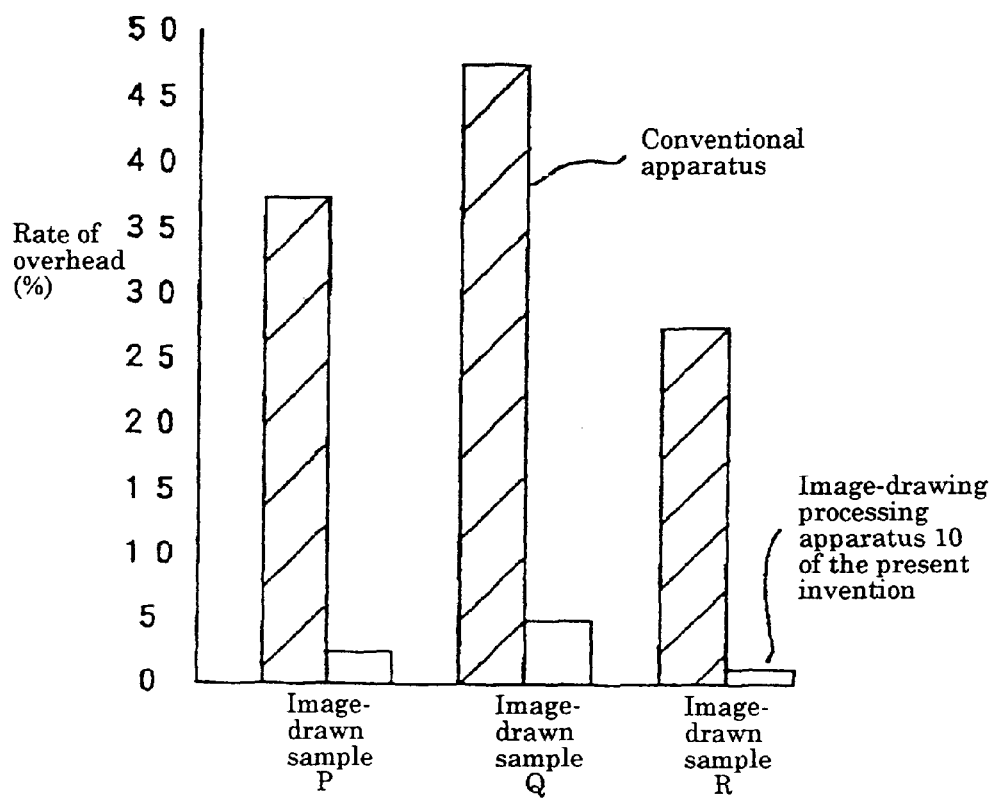
FIG. 28 is a diagram for describing the result of measurements made to rates of overheads between an image-drawing processing apparatus and a conventional apparatus.

FIG. 28 is a diagram showing the result of measurements made to rates of overheads between the image-drawing processing apparatus 10 and the conventional apparatus. The vertical axis assumes the rate (%) of overheads therebetween and shows overheads at the time that image-drawn samples P, Q, and R are subjected to image-drawing processing. Diagonally-shaded bar graphs correspond to the overheads of the conventional apparatus, whereas white-unlined bar graphs correspond to the overheads of the image-drawing processing apparatus 10 according to the present invention.

It can be understood that since the conventional apparatus must perform processes such as a process for determining to which divided image-drawing area all the image-drawn factor elements should be distributed, a process for dividing and duplicating data, etc., the overhead is very large or heavy.

The image-drawing processing apparatus 10 according to the present invention does not need the pre-treatment for distributing the image-drawn factor elements to the respective divided image-drawing areas in advance. Further, since the reference values that have classified the image-drawn factor elements, are specified to read the image-drawn factor elements, unnecessary reading and determining processes are also reduced. It can be therefore understood that the overhead is greatly cut down.

Figure 29:
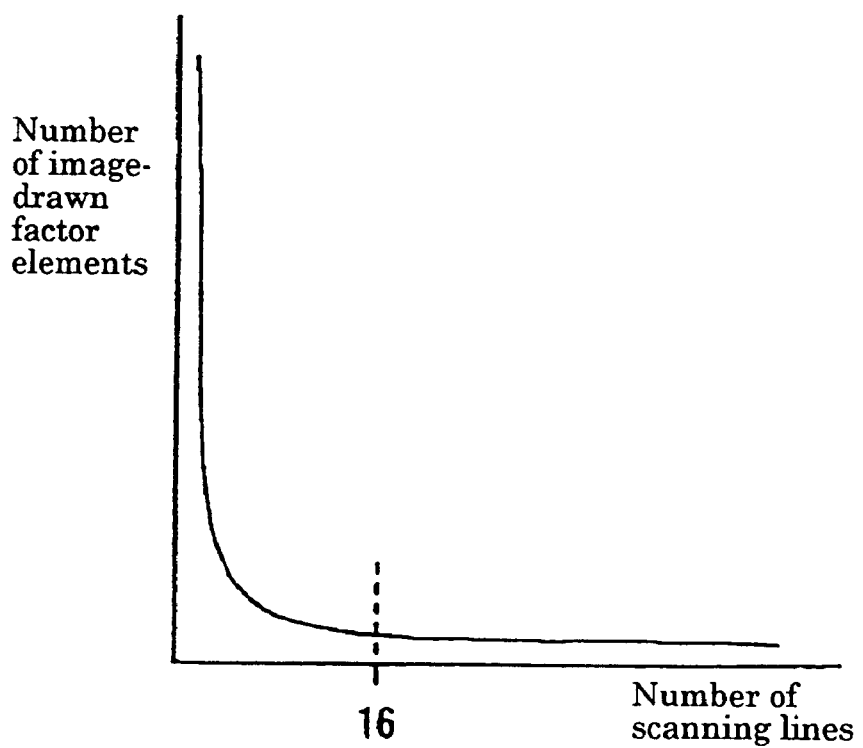
FIG. 29 is a distribution chart of image-drawn factor elements.

FIG. 29 is a diagram showing a distribution related to the height of image-drawn factor elements. The horizontal axis takes numerical values obtained by converting the heights of image-drawn factor elements in a sub-scanning line direction into the number of scanning lines, whereas the vertical axis assumes the number of image-drawn factor elements.

As the height of the image-drawn factor elements decreases as shown in the drawing, the number of the image-drawn factor elements extremely increases. Thus, the image-drawing processing apparatus 10 according to the present invention performs a specific classification on the image-drawn factor elements when the height of the image-drawn factor elements is less than or equal to the number of scanning lines corresponding to 16, for example, and thereby performs image-drawing processing on the image-drawn factor elements.

Thus, the image-drawn factor elements excluded from the image-drawing area in charge are little read into the image-drawing processors by simply utilizing the classification based on the length information.

Further, the number of the remaining image-drawn factor elements incapable of being specially handled, which can result in overhead, becomes much smaller than the number of the image-drawn factor elements processed by the present invention without any overhead. The present invention is not limited to the above description and many changes can be made thereto. For example, the list generating means 11 for forming the image-drawn object shown in FIG. 1 and the image-drawn factor elements sorting means 12 do not need to provide at the same positions as those of the image-drawing processing means. They may be connected thereto through a network. In this case, each of the image-drawing processing means 14 is provided with means for receiving a list of image-drawn factor elements constituting image-drawn objects from the list generating means or means for receiving the result of classification of image-drawn factor elements classified by reference values constant to information about the lengths of the image-drawn factor elements constituting the list. Further, for example, the synthesizing and outputting means 17 shown in FIG. 1 does not need to exist in the same position as that for each image-drawing processing means 14 and may be connected to the image-drawing processing means 14 through a network. In this case, the image-drawing processing means 14 includes means for transferring the result of image-drawing processing thereby to the synthesizing and outputting means 17.

According to an image-drawing processing apparatus of the present invention, as has been described above, image-drawing processors to which divided image-drawing areas are assigned, respectively selectively read image-drawn factor elements by use of reference values for classifying the image-drawn factor elements and perform parallel processing on them. As a result, pre-treatment for preparing data every divided image-drawing areas becomes unnecessary and a process related to unnecessary data that belong to those other than the image-drawing areas in charge can be also cut down. It is therefore possible to greatly reduce overhead and perform image-drawing processing at high speed.

According to an image-drawing processing executing method of the present invention, image-drawing processors to which divided image-drawing areas are assigned, respectively selectively read image-drawn factor elements by use of reference values for classifying the image-drawn factor elements and perform parallel processing on them. Thus, pre-treatment for preparing data every divided image-drawing areas becomes unnecessary and a process related to unnecessary data that belong to those other than the image-drawing areas in charge, can be also cut down. Therefore, the overhead can be greatly reduced and high-speed image-drawing processing can be performed.

What is claimed is:

1. An image-drawing processing apparatus for performing image-drawing processing on image-drawn object or image-drawn objects such as at least characters or graphics with the image-drawn objects as an input, comprising:

list generating means for generating a list of image-drawn factor elements constituting said image-drawn objects;

image-drawn factor elements sorting means for classifying said image-drawn factor elements by use of reference values constant to information about the lengths of said image-drawn factor elements constituting said list;

image-drawn factor elements storing means for storing said classified image-drawn factor elements therein so as to correspond to said reference values;

a plurality of image-drawing processing means for performing parallel image-drawing processing on said image-drawn factor elements;

image-drawing area allocating means for dividing an image-drawing area and assigning the divided image-drawing areas to said image-drawing processing means;

image-drawn factor elements transfer controlling means for transferring said image-drawn factor elements necessary for image-drawing processing of said image-drawing area from said image-drawn factor elements storing means to said image-drawing processing means in association with said reference values; and synthesizing and outputting means for synthesizing results of the image-drawing processing on the image-drawn factor elements by said image-drawing processing means and outputting the result of synthesis therefrom.

2. The image-drawing processing apparatus according to claim 1, wherein said image-drawing area allocating means assigns image-drawing areas in a horizontal direction and said image-drawn factor elements sorting means set heights of vertical lines orthogonal to boundaries between the adjacent respective image-drawing areas as said length information and classify said image-drawn factor elements by use of reference values constant to the length information.

3. The image-drawing processing apparatus according to claim 1, wherein said image-drawing area allocating means assigns image-drawing areas in a vertical direction and said image-drawn factor elements sorting means set widths of vertical lines orthogonal to boundaries between the image-drawing areas as said length information and classify the image-drawn factor elements by use of reference values constant to said length information.

4. The image-drawing processing apparatus according to claim 1, wherein said image-drawn factor elements transfer controlling means transfers image-drawn factor elements completely included within an image-drawing area as well as image-drawn factor elements which are partly included within the image-drawing area and have the length information less than or equal to the reference values, to said image-drawing processing means.

5. The image-drawing processing apparatus according to claim 1, wherein said image-drawn factor elements storing means continuously store said image-drawn factor elements therein upon storage of said image-drawn factor elements.

6. The image-drawing processing apparatus according to claim 1, wherein said image-drawing factor elements storing means discontinuously store said image-drawn factor elements therein upon storage of said image-drawn factor elements.

7. The image-drawing processing apparatus according to claim 1, wherein when storing said image-drawn factor elements, said image-drawn factor elements storing means define said image-drawn factor elements by a function with said length information and said reference values as parameters and store the same therein.

8. The image-drawing processing apparatus according to claim 1, wherein each of said image-drawing processing means holds therein position information about said image-drawing area previously taken under its charge and processed.

9. The image-drawing processing apparatus according to claim 1, wherein each of said image-drawing processing means calculates said reference values indicative of classifications for providing reading instructions, based on the range of said assigned image-drawing areas.

10. A method of performing image-drawing processing on image-drawn objects such as at least characters or graphics with the image-drawn objects as an input, comprising the following steps of:

generating a list of image-drawn factor elements constituting said image-drawn objects;

classifying said image-drawn factor elements by use of reference values constant to information about the lengths of said image-drawn factor elements constituting said list;

storing said classified image-drawn factor elements in association with said reference values;

dividing an image-drawing area;

transferring said image-drawn factor elements necessary for image-drawing processing of said image-drawing area in association with said reference values;

performing image-drawing processing on said transferred image-drawn factor elements; and synthesizing results of the image-drawing processing on the image-drawn factor elements and outputting the result of synthesis.

11. The method according to claim 10, further comprising a step of transferring said image-drawn factor elements completely included within an image-drawing area as well as image-drawn factor elements which are partly included within the image-drawing area and have the length information less than or equal to the reference values, when said image-drawn factor elements necessary for the image-drawing processing of said image-drawing area are transferred in association with said reference values.

12. An image-drawing processing apparatus for effecting image-drawing processing on image-drawn objects including at least characters or graphics, comprising:

means for receiving a list of image-drawn factor elements constituting said image-drawn objects;

image-drawn factor elements sorting means for classifying said image-drawn factor elements by use of reference values constant to information about the lengths of said image-drawn factor elements constituting said list received by said receiving means;

image-drawn factor elements storing means for storing said classified image-drawn factor elements therein in association with said reference values;

a plurality of image-drawing processing means for effecting parallel image-drawing processing on said image-drawn factor elements;

allocating means for dividing an image-drawing area and assigning the divided image-drawing areas to said image-drawing processing means;

image-drawn factor elements transfer controlling means for transferring said image-drawn factor elements necessary for image-drawing processing of the image-drawing area from said image-drawn factor elements sorting means to said image-drawing processing means in association with the reference values; and synthesizing and outputting means for synthesizing results of the image-drawing processing on the image-drawn factor elements by said image-drawing processing means and outputting the result of synthesis therefrom.

13. An image-drawing processing apparatus for performing image-drawing processing on image-drawn objects including at least characters or graphics, comprising:

means for receiving image-drawn factor elements list which classify image-drawn factor elements by use of reference values constant to information about the lengths of said image-drawn factor elements constituting said list from the list of the image-drawn factor elements constituting said image-drawn objects;

image-drawn factor elements storing means for storing said classified image-drawn factor elements therein in association with said reference values;

a plurality of image-drawing processing means for effecting parallel image-drawing processing on said image-drawn factor elements;

allocating means for dividing an image-drawing area and assigning the divided image-drawing areas to said image-drawing processing means;

image-drawn factor elements transfer controlling means for transferring said image-drawn factor elements necessary for image-drawing processing of the image-drawing area from said image-drawn factor elements sorting means to said image-drawing processing means in association with the reference values; and synthesizing and outputting means for synthesizing results of the image-drawing processing on the image-drawn factor elements by said image-drawing processing means and outputting the result of synthesis therefrom.

14. An image-drawing processing apparatus for effecting image-drawing processing on image-drawn objects including at least characters or graphics, comprising:

means for receiving a list of image-drawn factor elements constituting said image-drawn objects;

image-drawn factor elements sorting means for classifying said image-drawn factor elements by use of reference values constant to information about the lengths of said image-drawn factor elements constituting said list;

image-drawn factor elements storing means for storing said classified image-drawn factor elements therein in association with said reference values;

a plurality of image-drawing processing means for effecting parallel image-drawing processing on said image-drawn factor elements;

allocating means for dividing an image-drawing area and assigning the divided image-drawing areas to said image-drawing processing means;

image-drawn factor elements transfer controlling means for transferring said image-drawn factor elements necessary for image-drawing processing of the image-drawing area from said image-drawn factor elements sorting means to said image-drawing processing means in association with the reference values; and transferring means for transferring results of the image-drawing processing on the image-drawn factor elements by said image-drawing processing means.

15. An image-drawing processing apparatus for performing image-drawing processing on image-drawn objects including at least characters or graphics, comprising:

means for receiving a list of image-drawn factor elements constituting said image-drawn objects;

image-drawn factor elements sorting means for classifying said image-drawn factor elements by use of reference values constant to information about the lengths of said image-drawn factor elements constituting the list received by said receiving means;

image-drawn factor elements storing means for storing said classified image-drawn factor elements therein in association with said reference values;

a plurality of image-drawing processing means for effecting parallel image-drawing processing on said image-drawn factor elements;

allocating means for dividing an image-drawing area and assigning the divided image-drawing areas to said image-drawing processing means;

image-drawn factor elements transfer controlling means for transferring said image-drawn factor elements necessary for image-drawing processing of the image-drawing area from said image-drawn factor elements sorting means to said image-drawing processing means in association with the reference values; and transferring means for transferring results of the image-drawing processing on the image-drawn factor elements by said image-drawing processing means.

16. An image-drawing processing apparatus for performing image-drawing processing on image-drawn object or image-drawn objects such as at least characters or graphics with the image-drawn objects as an input, comprising:

list generating means for generating a list of image-drawn factor elements constituting said image-drawn objects;

image-drawn factor elements sorting means for classifying said image-drawn factor elements by use of reference values constant to information about the lengths of said image-drawn factor elements constituting said list;

image-drawn factor elements storing means for storing said classified image-drawn factor elements therein so as to correspond to said reference values;

image-drawing processing means for performing parallel image-drawing processing on said image-drawn factor elements;

image-drawing area allocating means for dividing an image-drawing area and assigning the divided image-drawing areas to said image-drawing processing means;

image-drawn factor elements transfer controlling means for transferring said image-drawn factor elements necessary for image-drawing processing of said image-drawing area from said image-drawn factor elements storing means to said image-drawing processing means in association with said reference values; and synthesizing and outputting means for synthesizing results of the image-drawing processing on the image-drawn factor elements by said image-drawing processing means and outputting the result of synthesis therefrom.

* * * * *